US008059991B2

(12) United States Patent
Andoh et al.

(10) Patent No.: US 8,059,991 B2
(45) Date of Patent: Nov. 15, 2011

(54) BELT-CONVEYANCE CONTROL DEVICE, IMAGE FORMING APPARATUS, BELT-CONVEYANCE CONTROL METHOD, AND COMPUTER PROGRAM PRODUCT

(75) Inventors: Toshiyuki Andoh, Kanagawa (JP); Hiromichi Matsuda, Kanagawa (JP); Satoru Tao, Ibaraki (JP); Noritaka Masuda, Ibaraki (JP); Yuji Uozaki, Ibaraki (JP); Yuichi Hirose, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 291 days.

(21) Appl. No.: 12/125,519

(22) Filed: May 22, 2008
(Under 37 CFR 1.47)

(65) Prior Publication Data

US 2010/0017019 A1 Jan. 21, 2010

(30) Foreign Application Priority Data

May 25, 2007 (JP) ................................ 2007-139084
Mar. 6, 2008 (JP) ................................ 2008-056437

(51) Int. Cl.
*G00G 15/00* (2006.01)
*G03G 15/01* (2006.01)
*G06F 7/00* (2006.01)
*G01C 00/00* (2006.01)

(52) U.S. Cl. ........ 399/167; 399/162; 399/299; 399/302; 399/303; 356/138; 356/142; 356/145; 356/153; 700/229

(58) Field of Classification Search .................. 399/162, 399/167, 299, 302, 303; 318/807; 356/138, 356/142, 153; 700/229
See application file for complete search history.

(56) References Cited

U.S. PATENT DOCUMENTS

| | | | | |
|---|---|---|---|---|
| 5,312,033 | A * | 5/1994 | Walton et al. | 226/108 |
| 6,941,096 | B2 * | 9/2005 | Matsuda et al. | 399/167 |
| 6,949,896 | B2 * | 9/2005 | Andoh et al. | 318/135 |
| 6,952,557 | B2 * | 10/2005 | Kobayashi | 399/394 |
| 6,999,173 | B2 * | 2/2006 | Kleinfeld et al. | 356/417 |
| 7,009,614 | B2 * | 3/2006 | Emmot et al. | 345/502 |
| 7,110,700 | B2 | 9/2006 | Andoh et al. | |
| 7,263,314 | B2 * | 8/2007 | Ueda et al. | 399/167 |
| 7,376,375 | B2 | 5/2008 | Kobayashi et al. | |
| 7,386,262 | B2 | 6/2008 | Okamura et al. | |
| 2003/0223786 | A1 * | 12/2003 | Kamoshita et al. | 399/302 |
| 2005/0099153 | A1 * | 5/2005 | Komatsu et al. | 318/807 |
| 2006/0110189 | A1 * | 5/2006 | Matsuda et al. | 399/301 |
| 2006/0133873 | A1 * | 6/2006 | Andoh et al. | 399/388 |
| 2007/0189815 | A1 * | 8/2007 | Andoh et al. | 399/303 |
| 2008/0232880 | A1 * | 9/2008 | Noguchi et al. | 399/397 |

FOREIGN PATENT DOCUMENTS

JP 62-242965 10/1987

(Continued)

*Primary Examiner* — David Gray
*Assistant Examiner* — Francis Gray
(74) *Attorney, Agent, or Firm* — Oblon, Spivak, McClelland, Maier & Neustadt, L.L.P.

(57) ABSTRACT

A control unit calculates a difference between a displacement of a belt detected by an encoder and a predetermined target value, calculates a pulse frequency of a driving pulse signal based on a feedback control based on the difference and a feed-forward control based on a reference driving pulse frequency, sets a control range of the feedback control to be equal to or smaller than a frequency of one rotation of a driven roller, and controls driving of a pulse motor such that the belt moves at a constant speed.

20 Claims, 9 Drawing Sheets

FOREIGN PATENT DOCUMENTS

| | | |
|---|---|---|
| JP | 10-78734 | 3/1998 |
| JP | 2754582 | 3/1998 |
| JP | 2000-47547 | 2/2000 |
| JP | 2001-66909 | 3/2001 |
| JP | 2006-171594 | 6/2006 |
| JP | 3965357 | 6/2007 |

* cited by examiner

FIG. 7
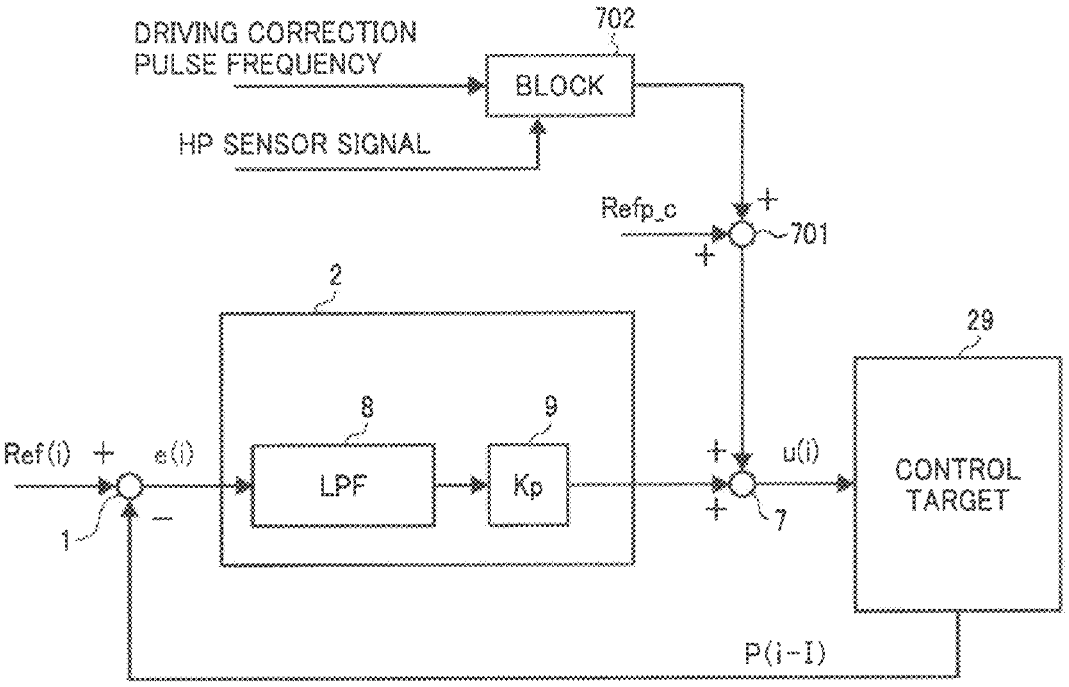
FIG. 8A
FIG. 8B
FIG. 8C
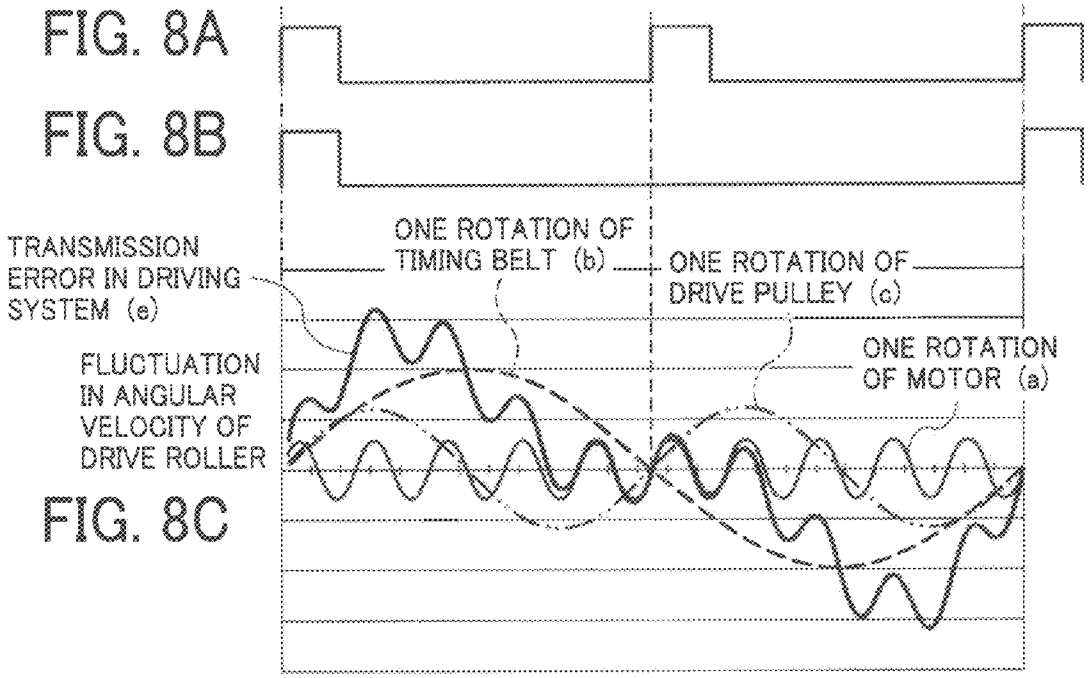

FIG. 11A
FIG. 11B
FIG. 11C
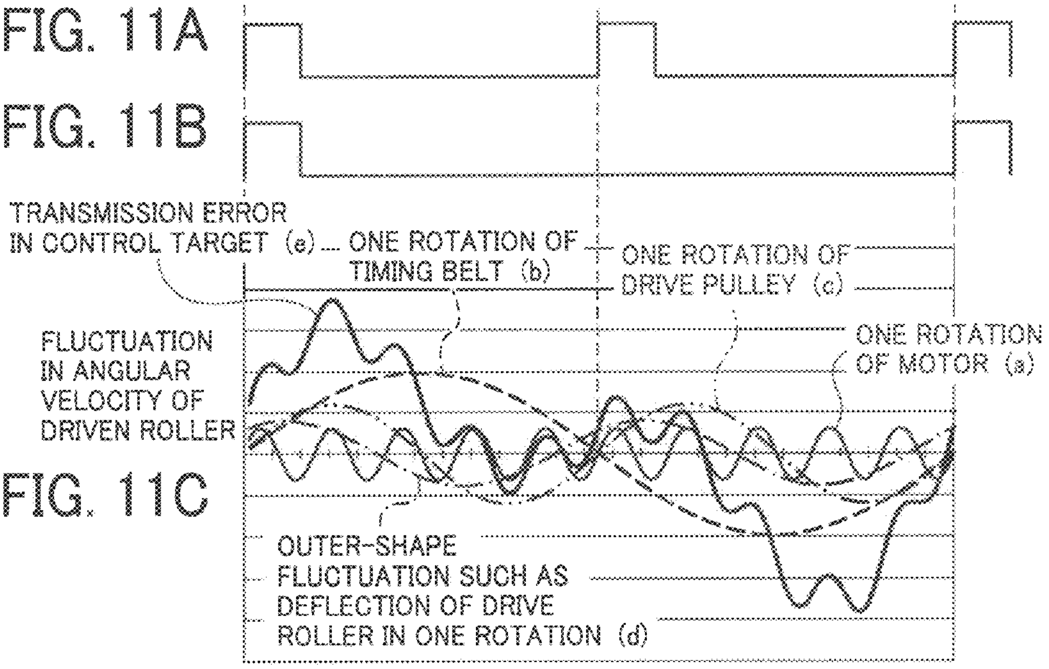
FIG. 12
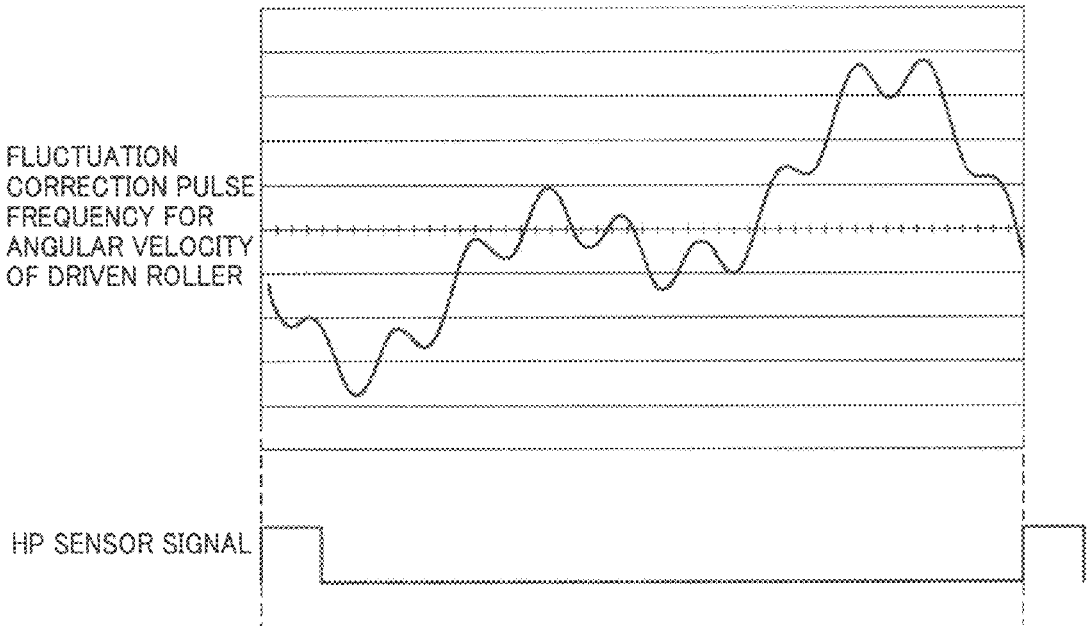

BELT-CONVEYANCE CONTROL DEVICE, IMAGE FORMING APPARATUS, BELT-CONVEYANCE CONTROL METHOD, AND COMPUTER PROGRAM PRODUCT

CROSS-REFERENCE TO RELATED APPLICATIONS

The present application claims priority to and incorporates by reference the entire contents of Japanese priority document 2007-139084 filed in Japan on May 25, 2007, and 2008-056437 filed in Japan on Mar. 6, 2008.

BACKGROUND OF THE INVENTION

1. Field of the Invention

The present invention relates to a belt-conveyance control device, an image forming apparatus, a belt-conveyance control method, and a computer program product for controlling belt conveyance.

2. Description of the Related Art

A typical image forming apparatus includes a belt conveying device such as a transfer belt, a photosensitive belt, or a sheet conveying belt. Driving such belts at a constant speed is necessary for obtaining images with high quality. For example, technologies are disclosed in Japanese Patent Application Laid-open No. S62-242965 and Japanese Patent Application Laid-open No. 2004-187413 to achieve a constant speed driving of the belt.

The technology disclosed in Japanese Patent Application Laid-open No. S62-242965 is to drive a belt that is supported by a drive shaft and a driven shaft at a constant speed by attaching an encoder for measurement to a driven roller and performing a feedback control based on information output from the encoder. Moreover, the technology disclosed in Japanese Patent Application Laid-open No. 2004-187413 is aimed at obtaining a drive control system with high accuracy, specially, by using a pulse motor. The belt conveying device in Japanese Patent Application Laid-open No. 2004-187413 includes a belt supported by a drive shaft and a driven shaft, and a power transmission system such as a pulse motor to drive the drive shaft to rotate, in which the drive shaft is driven to rotate by inputting driving pulses to the pulse motor thereby driving the belt at a constant speed. Specifically, in the belt conveying device, an angular displacement detecting unit is provided to the driven shaft, and a feedback system is formed to calculate a motor driving correction pulse frequency based on the difference between a target angular displacement of the driven shaft and a detected angular displacement, and the pulse motor is driven with a frequency that is obtained by adding the motor driving correction pulse frequency to a reference driving pulse frequency.

Both of the above technologies can cause the belt to drive at a constant speed. However, if the driven roller to which the encoder is attached is deflected, fluctuation component of the driven roller in one rotation occurs depending upon the amount of deflection of the driven roller.

A technology to solve the above problem is disclosed, for example, in Japanese Patent Application Laid-open No. 2000-047547, in which an outer diameter of a driven roller is an integral multiple or an inverse of an integral multiple of that of the drive roller to separate rotation frequencies of both rollers, and only the deflection component of the driven roller is canceled.

Furthermore, a technology disclosed in Japanese Patent Application Laid-open No. 2001-66909 is also known, in which a belt is supported by a driven roller and a drive roller, an encoder is attached to the driven roller to detect fluctuation of the drive roller in one rotation, and the belt is controlled by open control.

However, in the technology disclosed in Japanese Patent Application Laid-open No. 2000-047547, there is a limitation in layout of the driven roller and a drive roller, so that apparatuses capable of employing this technology are limited. In the technology disclosed in Japanese Patent Application Laid-open No. 2001-66909, a correction value is measured by the encoder attached to the driven roller, however, there is no description about deflection of the encoder. Moreover, because the feedback control is not performed, fluctuation of other components cannot be controlled. Therefore, driving the belt with high accuracy is difficult as a whole.

SUMMARY OF THE INVENTION

It is an object of the present invention to at least partially solve the problems in the conventional technology.

According to an aspect of the present invention, there is provided a belt-conveyance control device that includes a belt that is supported by a drive roller and a driven roller, a pulse motor that drives the drive roller, and a first encoder that is attached to the driven roller to detect a displacement of the belt. The belt-conveyance control device controls a conveying speed of the belt. The belt-conveyance control device further includes a control unit that calculates a difference between the displacement detected by the first encoder and a predetermined target value, calculates a pulse frequency of a driving pulse signal for driving the pulse motor based on a feedback control based on the difference and a feed-forward control based on a reference driving pulse frequency, sets a control range of the feedback control to be equal to or smaller than a frequency of one rotation of the driven roller, and controls driving of the pulse motor such that the belt moves at a constant speed.

Furthermore, according to another aspect of the present invention, there is provided an image forming apparatus including a belt-conveyance control device according to the present invention.

Moreover, according to still another aspect of the present invention, there is provided a method of controlling a conveying speed of a belt in a belt-conveyance control device that includes the belt that is supported by a drive roller and a driven roller, a pulse motor that drives the drive roller, and an encoder that is attached to the driven roller to detect a displacement of the belt. The method includes calculating a difference between the displacement detected by the encoder and a predetermined target value; calculating a pulse frequency of a driving pulse signal for driving the pulse motor based on a feedback control based on the difference and a feed-forward control based on a reference driving pulse frequency; setting a control range of the feedback control to be equal to or smaller than a frequency of one rotation of the driven roller; and controlling driving of the pulse motor such that the belt moves at a constant speed.

Furthermore, according to still another aspect of the present invention, there is provided a computer program product including a computer-usable medium having computer-readable program codes embodied in the medium for controlling a conveying speed of a belt in a belt-conveyance control device that includes the belt that is supported by a drive roller and a driven roller, a pulse motor that drives the drive roller, and an encoder that is attached to the driven roller to detect a displacement of the belt. The program codes when executed cause a computer to execute calculating a difference between the displacement detected by the encoder and a predetermined target value; calculating a pulse frequency of a driving pulse signal for driving the pulse motor based on a feedback control based on the difference and a feed-forward control based on a reference driving pulse frequency; setting a control range of the feedback control to be equal to or smaller than a frequency of one rotation of the driven roller; and controlling driving of the pulse motor such that the belt moves at a constant speed.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 7 is a block diagram of the belt-conveyance control device for performing a belt-conveyance control method according to the second embodiment;

FIGS. 8A to 8C are waveform diagrams representing a result of measurement in a case where two periods of a signal in one rotation of a drive roller correspond to a transmission error period of a drive system in the belt-conveyance control device;

FIGS. 11A to 11C are waveform diagrams representing a result of measurement in a case where two periods of a signal in one rotation of a drive roller correspond to a transmission error period of a drive system in the belt-conveyance control device;

FIG. 12 is a waveform diagram representing a correction pulse frequency for canceling fluctuation shown in FIG. 11C;

DETAILED DESCRIPTION OF THE PREFERRED EMBODIMENTS

Exemplary embodiments of the present invention are explained in detail below with reference to the accompanying drawings.

Figure 1:
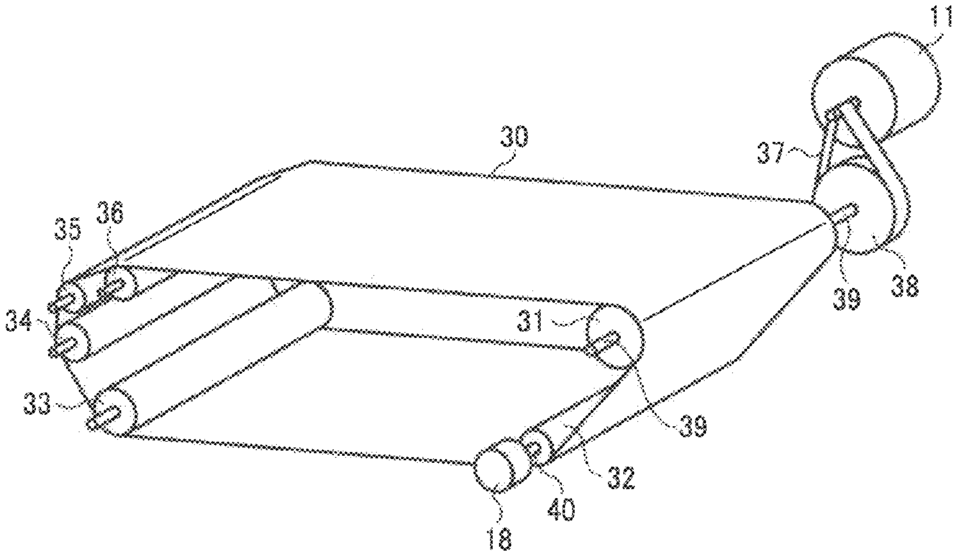
FIG. 1 is a perspective view of a belt-conveyance control device according to a first embodiment of the present invention.

FIG. 1 is a perspective view of a belt-conveyance control device as a belt device according to a first embodiment of the present invention, in which a pulse motor 11 as a rotation drive source is controlled to be driven so that an endless belt 30 that is supported by a drive roller 31, and a plurality of driven rollers 32, 33, 34, 35, and 36 moves at a predetermined constant speed. A rotational torque (a driving force) of the pulse motor 11 is transmitted to a drive shaft 39 of the drive roller 31 via a reduction system such as a timing belt 37 and a driven pulley 38 constituting a power transmission system. The belt 30 starts to move when the rotational torque of the pulse motor 11 is transmitted to the drive roller 31. In the present embodiment, angular displacement of the driven roller 32 is detected by a unit that includes an encoder 18. The encoder 18 is attached to a driven shaft 40 of the driven roller 32 via a coupling (not shown).

Figure 2:
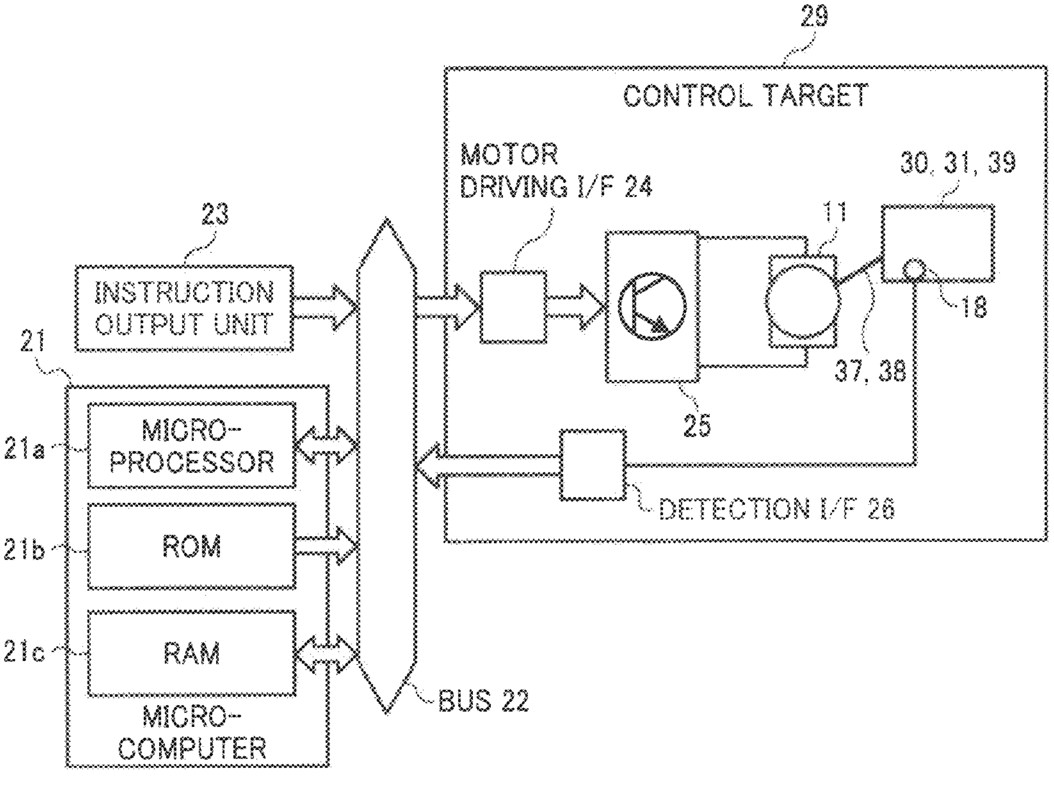
FIG. 2 is a block diagram of a hardware configuration of a control system for a pulse motor and a control target thereof in the belt-conveyance control device.

FIG. 2 is a block diagram of a hardware configuration of a control system for the pulse motor 11 and a control target thereof. The control system digitally controls the angular displacement of the pulse motor 11 based on a signal output from the encoder 18.

The control system includes a microcomputer 21, a bus 22, an instruction output unit 23, a motor driving interface (I/F) 24, a motor driving unit 25, and a detection I/F 26. The microcomputer 21 includes a microprocessor 21*a*, a read only memory (ROM) 21*b*, and a random access memory (RAM) 21*c*. The microprocessor 21*a* executes programs stored in the ROM 21*b* using the RAM 21*c* as a work area. The microprocessor 21*a*, the ROM 21*b*, the RAM 21*c*, and the like are connected to one another via the bus 22.

The instruction output unit 23 outputs an instruction signal instructing a driving frequency of a driving pulse signal for the pulse motor 11. The instruction output unit 23 is also connected to the bus 22 on its output side.

The detection I/F 26 processes pulses output from the encoder 18 to convert them to a digital value. The detection I/F 26 includes a counter for counting the number of pulses output from the encoder 18, and converts the counted number of pulses to a digital value corresponding to the angular displacement of the driven roller 32 by multiplying it by a predetermined conversion constant of pulse number to angular displacement. A signal indicating the digital value corresponding to the angular displacement of the driven roller 32 is sent to the microcomputer 21 via the bus 22.

The motor driving unit 25 operates based on the pulse-shaped control signal output from the motor driving I/F 24 to apply a pulse-shaped driving voltage to the pulse motor 11. With the application of the pulse-shaped driving voltage, the pulse motor 11 is controlled to be driven at a predetermined driving frequency output from the instruction output unit 23. Therefore, follow-up control is performed such that the angular displacement of the driven roller 32 follows a target angular displacement, and the belt 30 supported by the driven roller 32 moves at a predetermined constant speed. The angular displacement of the driven roller 32 is detected by the encoder 18 and the detection I/F 26, and is taken in the microcomputer 21 to repeat the control.

As shown in FIG. 2, a control target 29 includes the whole belt drive system shown in FIG. 1, the motor driving I/F 24, the motor driving unit 25, and the detection I/F 26.

Figure 3:
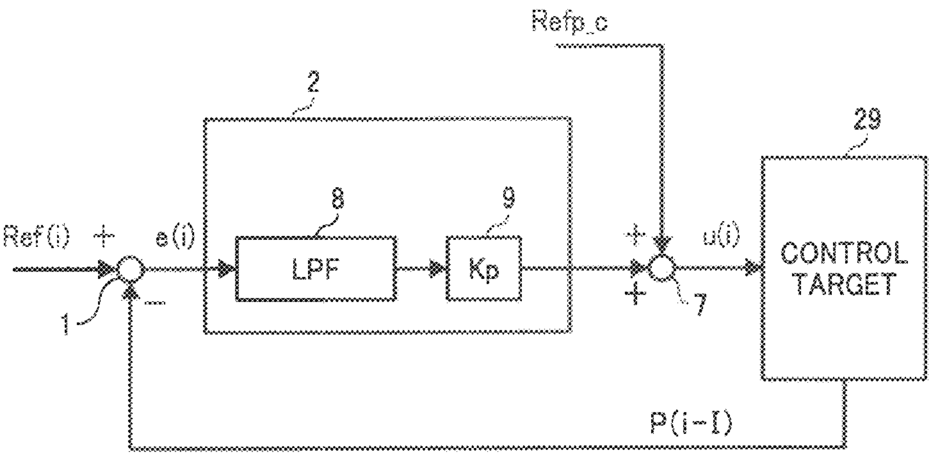
FIG. 3 is a block diagram of the belt-conveyance control device for performing a belt-conveyance control method according to the first embodiment.

FIG. 3 is a block diagram of a control configuration of the belt-conveyance control device. As shown in FIG. 3, a detected angular displacement P(i-1) that is information output from the detection I/F 26 for processing a pulse signal output from the encoder 18 (i.e., information on the angular displacement of the driven roller 32) is input to a calculator (a subtractor) 1. The calculator 1 calculates a difference e(i) between a target angular displacement Ref(i) that is a control target value of the driven roller 32 and the detected angular displacement P(i-1) of the driven roller 32. The difference e(i) is input to a controller 2. The controller 2 includes a low-pass filter (LPF) 8 for removing high-frequency noise and a proportional element (a gain Kp) 9. The controller 2 obtains a correction control amount with respect to the reference driving pulse frequency used for driving the pulse motor 11, which is input to a calculator 7. In the calculator 7, the correction control amount is added to a constant reference driving pulse frequency Refp_c, so that a driving pulse frequency u(i) is determined. A driving pulse signal is generated by the motor driving I/F 24 and the motor driving unit 25 based on the driving pulse frequency u(i) of the driving pulse signal calculated in the calculator 7, which is output to the pulse motor 11. A driving force of the pulse motor 11 that is controlled to be driven in this manner is transmitted to the drive roller 31 via the timing belt 37 and the driven pulley 38, so that the driven roller 32 rotates at a constant angular velocity in accordance with the predetermined target angular displacement. The control operation of the above feedback loop is repeated.

In the controller 2, a proportional control system is used as one example; however, it is not limited thereto. All the above calculations are executed in the microcomputer 21. The reference driving pulse frequency Refp_c is a pulse frequency that is uniquely determined by performing a multiplication by the angular velocity of a target drive roller (driving pulse frequency of a pulse motor in one rotation/2π/reduction ratio of a reduction system) based on the angular velocity of the drive roller 31, a reduction ratio of the reduction system, and the like. However, in the present embodiment, the reference driving pulse frequency Refp_c can be arbitrary selected within a range in which a step-out phenomenon does not occur while the motor is driven. Moreover, the target angular displacement Ref(i) can be easily obtained by integrating the target constant angular velocity of the driven roller 32.

The purpose of the control system is to move the belt 30 at a constant speed. If the driven roller 32 is not deflected, i.e., the driven roller 32 has no eccentricity, driving the driven roller 32 at a constant angular velocity in the above system is considered to be equivalent to driving the belt at a constant speed. However, it is almost impossible to form a roller without deflection in practice. In addition, generally, in the feedback control system, a control range needs to be set wide for improving performance. Generally, a frequency of a driven roller in one rotation is often several hertz, and large control gain is obtained even with this frequency. Therefore, in a general system in which the driven roller 32 is deflected, a frequency of an encoder roller in one rotation is included in the driving components of the belt only with the above control system.

Figure 4:
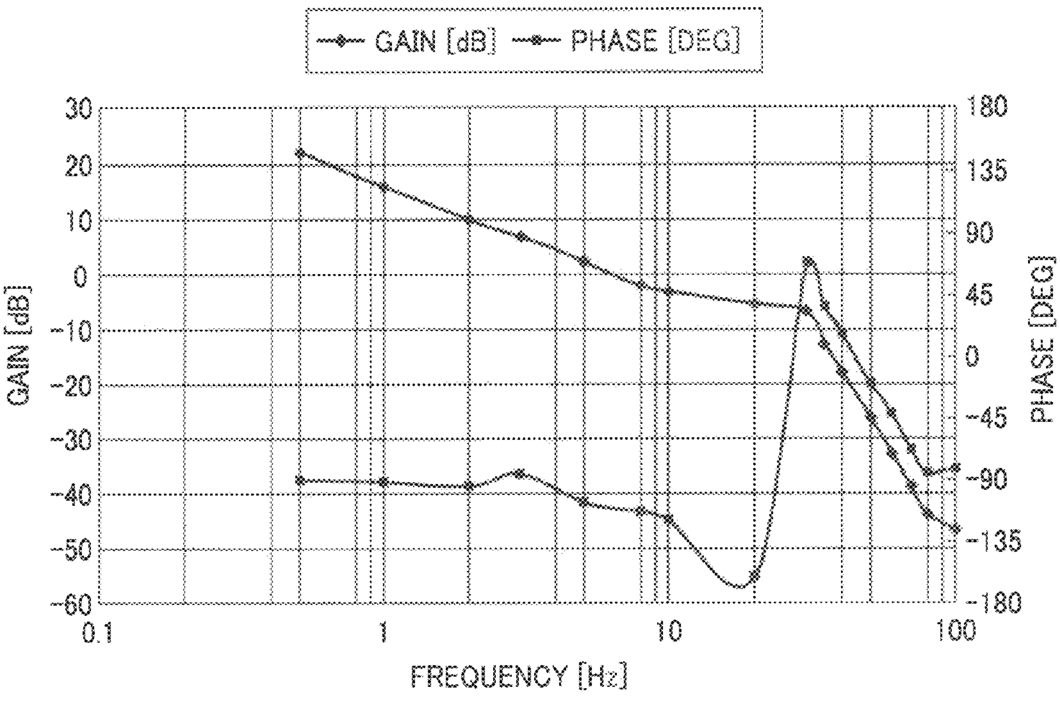
FIG. 4 is an open loop transfer function from Ref to P shown in FIG. 3.

Thus, as shown in FIG. 4, the control range of the feedback control system is set to be lower than the frequency of the driven roller 32 to which the encoder 18 is attached in about one rotation. FIG. 4 is an open loop transfer function from Ref to P shown in FIG. 3. The frequency of the driven roller 32 in one rotation is set to six hertz, and the proportional gain in the feedback system is set so that the zero cross frequency in the open loop of the control system is about six hertz. A butterworth filter with a cutoff frequency of 50 hertz is used to filter noise as one example. With the above setting, only fluctuation of frequency components lower than the frequency of the driven shaft 40 to which the encoder 18 is attached is controlled (i.e., the frequency of the driven shaft 40 is not controlled), so that the belt-conveyance control device capable of driving the belt with high accuracy can be obtained.

Furthermore, for reliably driving the belt at a constant speed, it is necessary to suppress fluctuation components due to rotation of shafts with eccentricity or the like, and outer-shape fluctuation components including deflection of the drive roller. This is achieved to some degree by improving mechanical accuracy, and is more simply achieved by the effect of the feedback control by setting the fluctuation frequency caused by the transmission system to be equal to or lower than the frequency of the driven roller in one rotation in the system in which the control range of the feedback control system is set to be approximately equal to or lower than the frequency of the driven roller to which the encoder is attached in one rotation.

The error in the transmission system and the outer-shape fluctuation component of the drive roller are separately explained. Although it is most desirable to reduce both of them, it is apparent that sufficient effect can be obtained even if only one of them is reduced.

As shown in FIG. 1, a system including the timing belt 37 is shown as a transmission device from the pulse motor 11 to the drive roller 31. Such transmission system causes fluctuation of the timing belt 37 in one period due to the positional fluctuation of a core of the timing belt 37. However, one rotation of the timing belt 37 is lower in frequency than one rotation of the driven roller 32. Therefore, the feedback control works to control the fluctuation of the timing belt 37. The eccentricity of the driven pulley 38 is present as one rotation of the drive roller 31. Furthermore, when a gear transmission system, specially, one-step reduction with a large diameter gear is used as the transmission system, fluctuation of the transmission system in one rotation coincides with the frequency of the drive roller 31. These fluctuation components can be reduced in the same manner as the reduction of the fluctuation of the drive roller in one rotation. Specifically, as shown in FIG. 1, these fluctuation components can be reduced by making the diameter of the drive roller 31 larger than that of the driven roller 32. Therefore, one rotation of the drive roller 31 becomes lower in frequency than one rotation of the driven roller 32. Thus, the feedback control works to control the fluctuation of the drive roller 31.

According to the present embodiment, relative limitation of the drive roller 31 and the driven roller 32 to which the encoder 18 is attached is only the diameter thereof, so that the relation between the drive roller 31 and the driven roller 32 does not need to be strictly determined like in the conventional technology in which the diameter ratio between the drive roller and the driven roller needs to be an integral ratio. Therefore, the belt can be easily driven at a constant speed without much limitation in layout of the drive roller 31 and the driven roller 32, enabling the image forming apparatus to obtain high quality images.

As above, the belt 30 can be driven at a constant speed by making the frequency of the fluctuation of a control target lower than the frequency of the driven roller in one rotation. However, in practice, it is difficult to make the rollers have a large difference in size in consideration of layout. Therefore, in a second embodiment, another method of improving accuracy in driving the belt is explained, in which a transmission error by the transmission system from the motor shaft to the drive roller is cancelled.

In the present embodiment, a target pulse frequency for cancelling fluctuation components from the drive motor to the drive roller is added to the reference driving pulse frequency.

Figure 5:
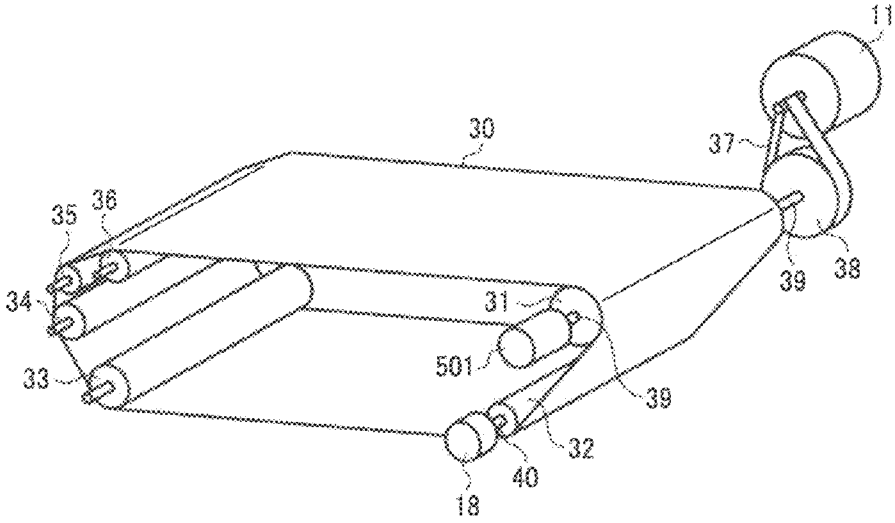
FIG. 5 is a perspective view of a belt-conveyance control device according to a second embodiment of the present invention.

FIG. 5 is a perspective view of a belt-conveyance control device according to the second embodiment of the present invention. In FIG. 5, the same components as those in FIG. 1 are provided with the same reference numerals, and the explanations thereof are omitted herein. In the present embodiment, an encoder 501 for measuring angular velocity or angular displacement is attached to the drive roller 31, and a home position detecting sensor (not shown) for detecting a home position in one rotation is also attached to the drive roller 31. The home position detecting sensor can be attached to other portions of the transmission system (e.g., the timing belt 37 in the present embodiment) instead of the drive roller 31.

Figure 6:
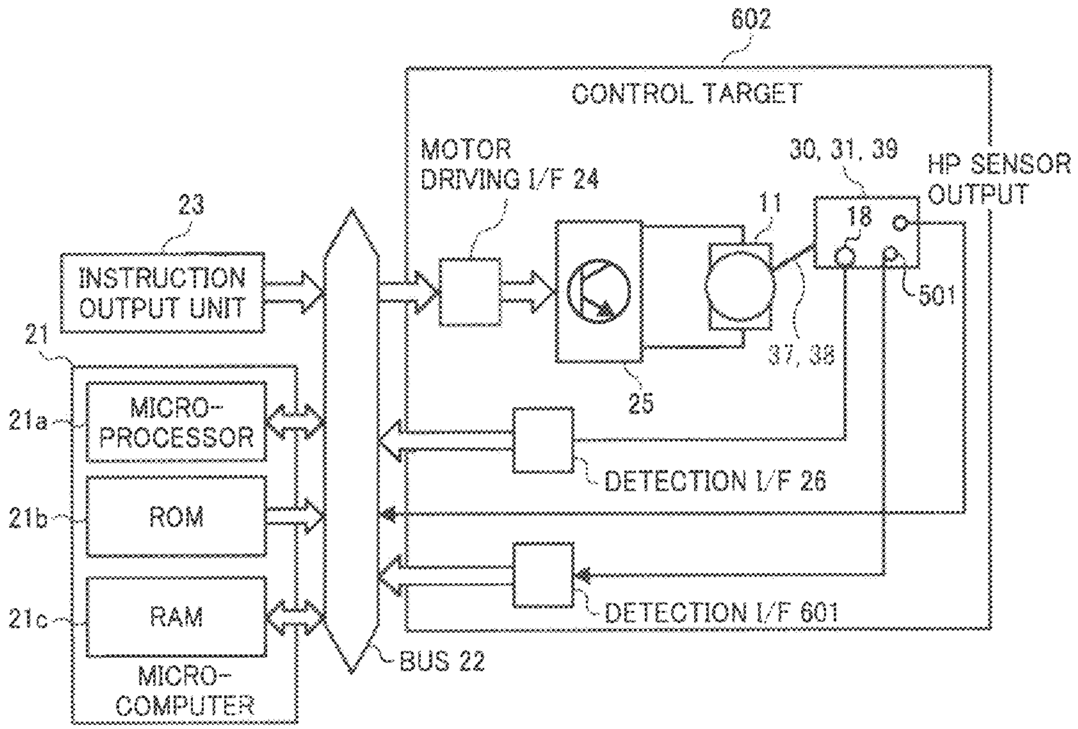
FIG. 6 is a block diagram of a hardware configuration of a control system for a pulse motor and a control target thereof in the belt-conveyance control device.

FIG. 6 is a block diagram of a hardware configuration of a control system for the pulse motor 11 and a control target thereof. In FIG. 6, the same components as those in FIG. 2 are provided with the same reference numerals, and the explanations thereof are omitted herein.

As shown in FIG. 6, the encoder 501 is connected to a detection interface 601 which processes pulses output from the encoder 501 to convert them to a digital value. The detection I/F 601 includes a timer counter for measuring intervals between the pulses output from the encoder 501. The detection I/F 601 converts the value counted by the timer counter to a digital value corresponding to the angular velocity of the drive roller 31 by multiplying it by a predetermined conversion constant of pulse number to angular velocity. A signal indicating the digital value corresponding to the angular velocity of the drive roller 31 is sent to the microcomputer 21 via the bus 22. The output of the home position detecting sensor for detecting a correction pulse is also sent to the microcomputer 21 via the bus 22. The microcomputer 21 generates an HP sensor signal representing a correction period with reference to the signal output from the home position detecting sensor.

The signal having a digital value corresponding to the angular velocity measured by the encoder 501 is stored in the memory (RAM) 21*c* as pulses representing the transmission error of the drive system with reference to the HP sensor signal representing the correction period, and the driving correction pulse frequency for correcting the transmission error of the drive system is calculated to be stored in the memory (RAM) 21*c*.

As shown in FIG. 6, a control target 602 includes the whole belt drive system shown in FIG. 5, the motor driving I/F 24, the motor driving unit 25, and the detection I/Fs 26 and 601.

FIG. 7 is a block diagram of a control configuration of the belt-conveyance control device. In FIG. 7, the same components as those in FIG. 3 are provided with the same reference numerals, and the explanations thereof are omitted herein.

In addition to the components of the belt-conveyance control device in the first embodiment, the belt-conveyance control device in the second embodiment further includes a calculating unit 701 and a block 702. In the calculator 7, an output from the calculating unit 701 is added to the correction control amount output from the proportional element 9 shown in FIG. 7, whereby a driving pulse frequency u(i) is determined. In the calculating unit 701, the driving correction pulse frequency for correcting the transmission error is further added to the constant reference driving pulse frequency Refp_c. In the block 702, the driving correction pulse frequency is reset every time the HP sensor signal is input thereto, and an initial value is input.

Based on the driving pulse frequency u(i) of the driving pulse signal calculated by the calculator 7, a driving pulse signal is generated by the motor driving I/F 24 and the motor driving unit 25 to be output to the pulse motor 11. A driving force of the pulse motor 11 that is controlled to be driven in such a manner is transmitted to the drive roller 31 via the timing belt 37 and the driven pulley 38, so that the driven roller 32 rotates at a constant angular velocity in accordance with the predetermined target angular displacement. The control operation of the above feedback loop is repeated.

When the driving correction pulse frequency for correcting the transmission error of the drive system is calculated, the hardware configurations shown in FIGS. 5 and 6 are used and the pulse motor 11 is controlled to be driven at a constant pulse frequency. Publicly known methods can be used for the calculation, such as that disclosed in detail in Japanese Patent No. 2754582 which is briefly explained below.

First, the pulse motor 11 is driven at a constant pulse frequency. At this time, the feedback control shown in FIG. 3 is not performed (i.e., Kp=0). Then, the angular velocity of the drive roller 31 is measured based on the output of the encoder 501 by rotating the drive roller 31 for a period equal to or more than the transmission error period of the drive system with reference to a signal output from the home position sensor, and is stored in the memory.

The transmission error period of the drive system is a least common multiple of periodical fluctuations occurred in the transmission system. For example, the periods of the fluctuation occurred in the transmission system in the belt-conveyance control device shown in FIG. 1 are as follows.

(a) one rotation of the motor (b) one cycle of the timing belt (c) one rotation of the drive pulley (one rotation of the drive roller)

Therefore, the least common multiple of these periods corresponds to the transmission error period of the drive system. The home position detecting sensor is attached to the drive roller 31, so that the number of rotations of the drive roller 31 corresponding to the obtained least common multiple is calculated. An HP signal (i.e., a signal output from the home position detecting sensor) is recounted based on the calculated number of the rotations of the drive roller 31, thereby obtaining an HP sensor signal.

FIGS. 8A to 8C are waveform diagrams representing a result of measurement in a case where two periods of a signal in one rotation of the drive roller 31 correspond to the transmission error period of the drive system. The amplitude of the waveforms shown in FIGS. 8A to 8C is expanded for easy understanding. FIG. 8A is a waveform diagram representing a signal (the HP signal) output from the home position detecting sensor attached to the drive roller 31, in which a pulse is generated every one rotation of the drive roller 31. FIG. 8B is a waveform diagram representing the HP sensor signal that represents the transmission error period of the drive system generated based on the HP signal shown in FIG. 8A. In this case, the number of the pulses shown in FIG. 8A is counted and a program is made so that a pulse shown in FIG. 8B is generated every two pulses shown in FIG. 8A, thereby generating the HP sensor signal. FIG. 8C is a waveform diagram representing a result of measurement of the angular velocity of the drive roller 31 with reference to the pulses shown in FIG. 8B.

As shown in FIG. 8C, characteristics of (a) one rotation of the motor, (b) one cycle of the timing belt, and (c) one rotation of the drive pulley, and (e) transmission error of the drive system are illustrated.

Even if the pulse motor 11 is driven at a constant pulse frequency, fluctuation components due to rotation of shafts with eccentricity or the like occur in the system from the motor shaft to the drive roller as shown in FIG. 8C. However, the period thereof repeats the same fluctuation every least common multiple of the periodical fluctuations of the main factors of the fluctuation.

Figure 9:
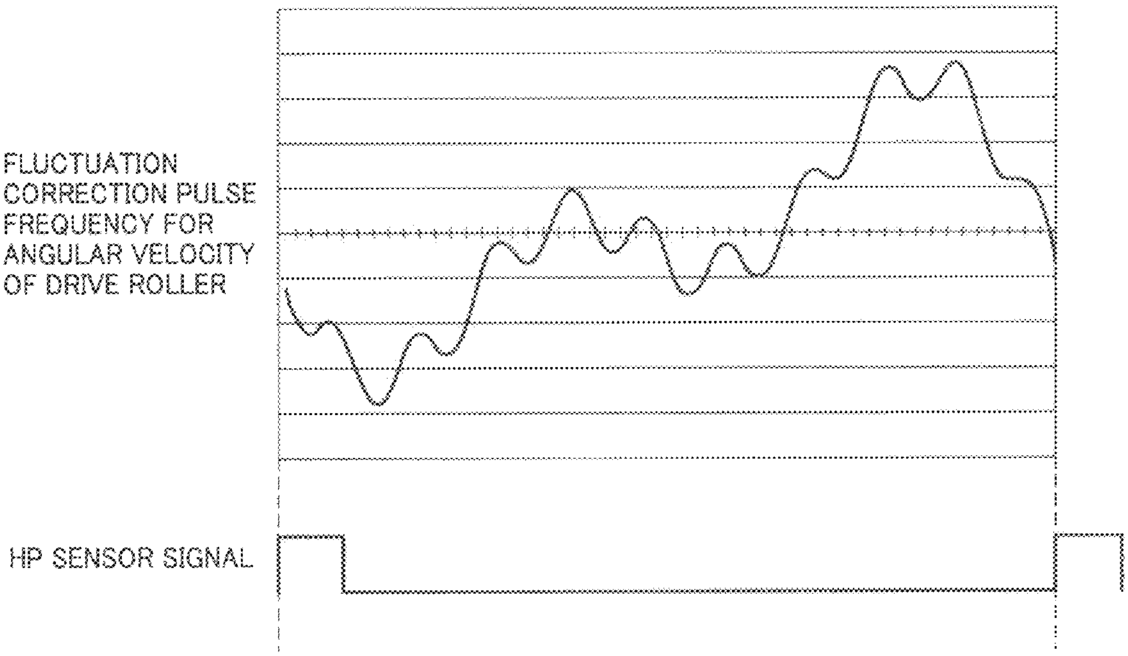
FIG. 9 is a waveform diagram representing a correction pulse frequency for canceling fluctuation shown in FIG. 8C.

Therefore, the fluctuation can be canceled by driving with a fluctuation correction pulse frequency as shown in FIG. 9 that has a phase opposite to the fluctuation shown in FIG. 8C and amplitude same as that of the fluctuation shown in FIG. 8C. The fluctuation correction pulse frequency is obtained by determining a target average speed with respect to the fluctuation and inverting the fluctuation with respect to the target average speed. The correction pulse is stored in the RAM 21*c* as a value for every sampling period for control, and is repeatedly used every time detection is made by the HP detecting sensor. Therefore, the fluctuation in the transmission system from the pulse motor 11 to the drive roller 31 is corrected, so that the belt 30 can be driven at a constant speed without largely making the frequency of fluctuation that needs to be controlled different from the frequency of the driven roller 32 in one rotation. Specially, even when the frequency of fluctuation that needs to be controlled is higher than the frequency of the driven roller 32 in one rotation, the belt 30 can be driven at a constant speed.

According to the present embodiment, the belt can be driven at a constant speed without much limitation in layout of the driven roller and the drive roller, enabling the image forming apparatus to obtain high quality images.

In a third embodiment, outer-shape fluctuation such as deflection of the drive roller in one rotation or the like is corrected in addition to the fluctuation in the transmission system from the drive motor to the drive roller in the second embodiment to drive the belt with higher accuracy.

A belt-conveyance control device in the third embodiment is basically the same as that in the first embodiment shown in FIG. 1 except that a home position detecting sensor (not shown) is attached to the drive roller 31. The home position detecting sensor is a sensor for detecting a signal of the correction pulse frequency added to the reference driving pulse frequency. The home position detecting sensor can be attached to other portions of the transmission system (e.g., the timing belt 37 in the present embodiment) instead of the drive roller 31.

In the present embodiment, in order to measure fluctuation with the driven roller 32, it is necessary to separate the outer-shape fluctuation due to deflection of the encoder roller or the like and the outer-shape fluctuation due to deflection of the drive roller 31 or the like. For this reason, both rollers are different in diameter. However, frequency of the drive roller 31 can be lowered by making the diameter of the drive roller 31 larger. Consequently, the effect of the feedback control can be superimposed, enabling to control the belt to be driven at a constant speed with higher accuracy.

Figure 10:
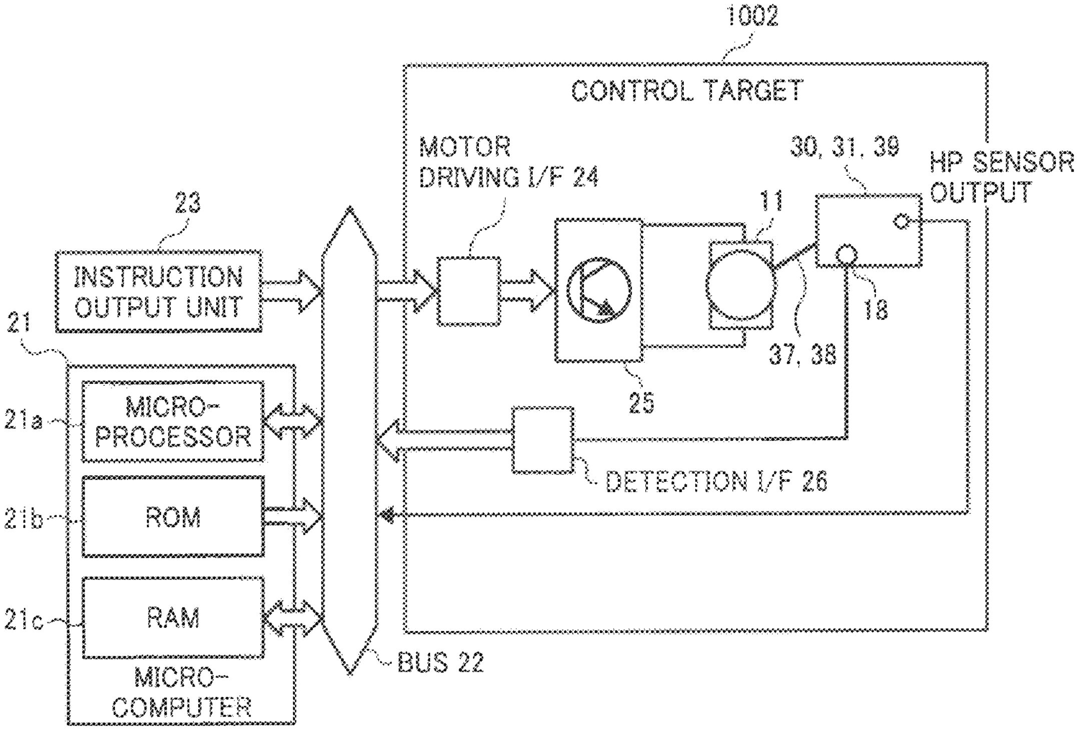
FIG. 10 is a block diagram of a hardware configuration of a control system for a pulse motor and a control target thereof in a belt-conveyance control device according to a third embodiment.

FIG. 10 is a block diagram of a hardware configuration of a control system for the pulse motor 11 and a control target thereof. In FIG. 10, the same components as those in FIG. 2 are provided with the same reference numerals, and the explanations thereof are omitted herein.

In the same manner as the second embodiment shown in FIG. 6, the output of the home position detecting sensor for detecting a correction pulse is sent to the microcomputer 21 via the bus 22, and the microcomputer 21 generates an HP sensor signal representing a correction period with reference to the signal output from the home position detecting sensor.

The digital value corresponding to the angular velocity measured by the encoder 18 is stored in the memory (RAM) 21*c* as a pulse frequency representing the transmission error of the drive system and the outer-shape fluctuation such as deflection of the drive roller 31 in one rotation with reference to the HP sensor signal representing the correction period.

As shown in FIG. 10, a control target 1002 includes the whole belt drive system, the motor driving I/F 24, the motor driving unit 25, and the detection I/Fs 26.

A control configuration of the belt-conveyance control device in the present embodiment is basically the same as that shown in FIG. 7. However, the present embodiment is different from the second embodiment in that a driving correction pulse frequency is set to a value for correcting the transmission error of the drive system and the outer-shape fluctuation such deflection of the drive roller in one rotation.

In the present embodiment, as shown in FIG. 7, in the calculator 7, the driving correction pulse frequency calculated in the calculating unit 701 is added to the correction control amount output from the proportional element 9, whereby a driving pulse frequency u(i) is determined. The driving correction pulse frequency is calculated by further adding the value for correcting the transmission error of the drive system and the outer-shape fluctuation such deflection of the drive roller in one rotation to the constant reference driving pulse frequency Refp_c. In the block 702, the driving correction pulse frequency is reset every time the HP sensor signal is input thereto, and an initial value is input.

Based on the driving pulse frequency u(i) of the driving pulse signal calculated by the calculator 7, a driving pulse signal is generated by the motor driving I/F 24 and the motor driving unit 25 to be output to the pulse motor 11. A driving force of the pulse motor 11 that is controlled to be driven in such a manner is transmitted to the drive roller 31 via the timing belt 37 and the driven pulley 38, so that the driven roller 32 rotates at a constant angular velocity in accordance with the predetermined target angular displacement. The control operation of the above feedback loop is repeated.

One exemplary method of calculating the driving correction pulse frequency for correcting the transmission error of the drive system and the outer-shape fluctuation such deflection of the drive roller in one rotation is explained, in which a hardware configuration same as that in the third embodiment is used and the pulse motor 11 is controlled to be driven at a constant pulse frequency in the same manner as the third embodiment.

First, the pulse motor 11 is driven at a constant pulse frequency. At this time, the feedback control shown in FIG. 3 is not performed (i.e., Kp=0). Then, the angular velocity of the driven roller 32 is measured based on the output of the encoder 18 for a period equal to or more than an error period of the correction target with reference to a signal output from the home position sensor, and is stored in the memory. The error period of the correction target can be a least common multiple of periodical fluctuations occurred in the transmission system in the same manner as in the second embodiment. For example, the periods of the fluctuation occurred in the transmission system are as follows.

(a) one rotation of the motor (b) one cycle of the timing belt (c) one rotation of the drive pulley (one rotation of the drive roller)

(d) outer-shape fluctuation such as deflection of the drive roller in one rotation The correction target in the present embodiment includes that in the second embodiment and (d) outer-shape fluctuation such deflection of the drive roller in one rotation. The frequency of the outer-shape fluctuation is the same as that of (c) one rotation of the drive pulley, so that the frequency of the correction signal can be the same as that in the second embodiment. The home position detecting sensor is attached to the drive roller 31, so that the number of rotations of the drive roller 31 corresponding to the obtained least common multiple is calculated. The HP signal is recounted based on the calculated number of the rotations of the drive roller 31, thereby obtaining an HP sensor signal.

FIGS. 11A to 11C are waveform diagrams representing a result of measurement in a case where two periods of a signal in one rotation of the drive roller 31 correspond to the error period of the correction target. In FIG. 11C, the initial phases of (c) one rotation of the drive pulley (one rotation of the drive roller) and (d) outer-shape fluctuation such as deflection of the drive roller in one rotation are made different. The amplitude of the waveforms shown in FIGS. 11A to 11C is expanded for easy understanding in the same manner as in the second embodiment.

FIG. 11A is a waveform diagram representing a signal (the HP signal) output from the home position detecting sensor attached to the drive roller 31, in which a pulse is generated every one rotation of the drive roller 31. FIG. 11B is a waveform diagram representing the HP sensor signal that represents the error period of the correction target generated based on the HP signal shown in FIG. 11A. In this case, the number of the pulses shown in FIG. 11A is counted and a program can be made so that a pulse shown in FIG. 11B is generated every two pulses shown in FIG. 11A. FIG. 11C is a waveform diagram representing a result of measurement of the angular velocity of the driven roller 32 with reference to the pulses shown in FIG. 11B. Even if the pulse motor 11 is driven at a constant pulse frequency, fluctuation components due to rotation of shafts with eccentricity or the like occur in the system from the motor shaft to the driven roller 32 as shown in FIG. 11C. However, the period thereof repeats the same fluctuation every least common multiple of the periodical fluctuations of the main factors of the fluctuation. This signal is the pulse frequency representing the transmission error of the correction target. The fluctuation can be canceled by driving with a pulse frequency shown in FIG. 12 that has a phase opposite to the fluctuation shown in FIG. 11C, and amplitude same as that of the fluctuation shown in FIG. 11C.

FIG. 12 is a waveform diagram representing a fluctuation correction pulse frequency for canceling the fluctuation. This signal is obtained by determining a target average speed with respect to the fluctuation and inverting the fluctuation with respect to the target average speed. This value can be easily obtained as a correction pulse frequency by multiplying the angular velocity of the driven roller 32 by ((diameter of the driven roller)/(diameter of the drive roller)×(driving pulse frequency of the pulse motor in one rotation)/2π/(reduction ratio of a reduction system)). The correction pulse frequency is stored in the RAM 21*c* as a value for every sampling period for control, and is repeatedly used every time detection is made by the HP detecting sensor.

Therefore, the transmission error of the transmission system from the pulse motor 11 to the drive roller 31 and the outer-shape fluctuation such deflection of the drive roller 31 in one rotation are corrected in the drive shaft control system, so that the belt 30 can be driven at a constant speed.

In the present embodiment, the rotation frequency of the transmission system from the pulse motor 11 to the drive roller 31 and the rotation frequency of the drive roller 31 in one rotation are both made different from (or lower than) the rotation frequency of the driven roller 32 in one rotation. However, the belt 30 can be driven at a constant speed without much limitation in layout of the driven roller 32 and the drive roller 31 even if one of the above rotation frequencies is set as above, enabling the image forming apparatus to obtain high quality images.

Figure 13:
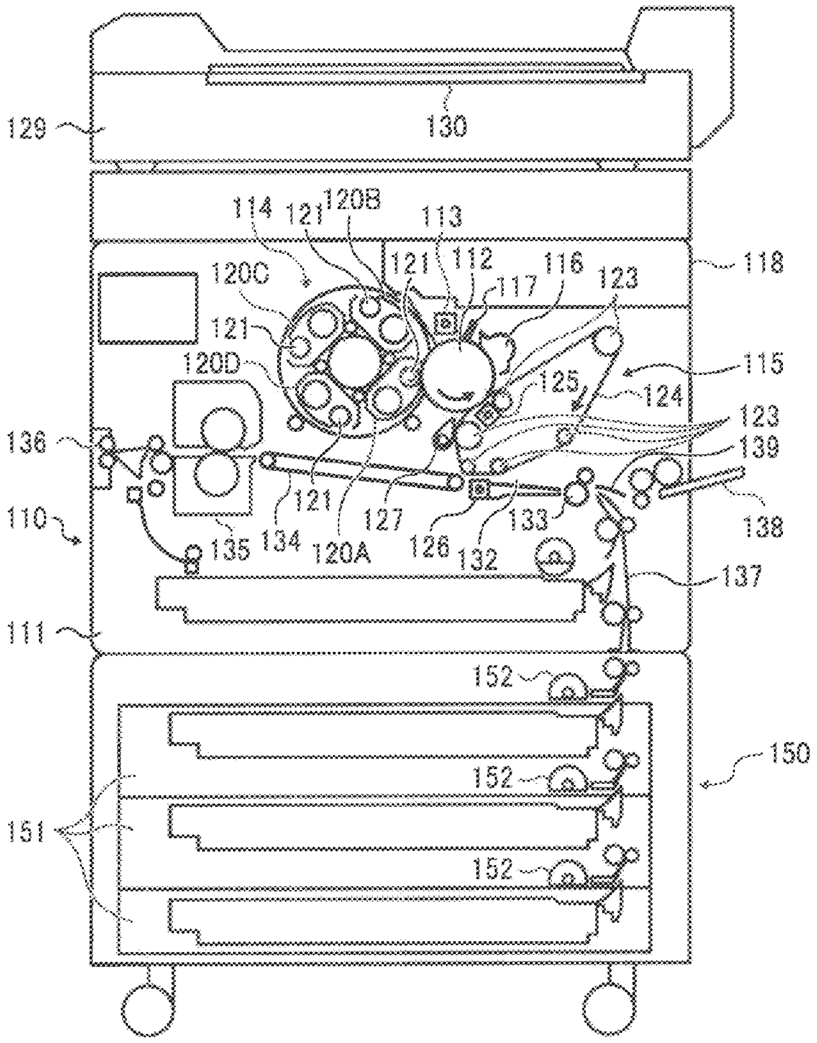
FIG. 13 is a schematic diagram of a color copier as an image forming apparatus according to a fourth embodiment of the present invention.

FIG. 13 is a schematic configuration diagram of a color copier as an image forming apparatus according to a fourth embodiment. As shown in FIG. 13, an apparatus body 110 of the color copier includes a drum-like photosensitive element (hereinafter, referred to as "photosensitive drum") 112 serving as an image carrier slightly on the left side from a center inside an exterior case 111. Around the photosensitive drum 112, a charging unit 113 arranged above the photosensitive drum 112, a rotary developing unit 114, an intermediate transfer unit 115, a cleaning unit 116, a neutralizing unit 117, and the like are arranged along a rotational direction of the photosensitive drum 112 indicated by an arrow (counterclockwise) in this order.

An optical writing unit 118 serving as an exposing unit, for example a laser writing unit, is arranged above the charging unit 113, the rotary developing unit 114, the cleaning unit 116, and the neutralizing unit 117. The rotary developing unit 114 includes developing elements 120A, 120B, 120C, and 120D, each element having a developing roller 121. The developing elements 120A, 120B, 120C, and 120D contain toners of yellow, magenta, cyan, and black, respectively. The rotary developing unit 114 is rotated about its center axis to selectively move one of the developing elements 120A, 120B, 120C, and 120D to a developing position opposing an outer periphery of the photosensitive drum 112.

In the intermediate transfer unit 115, an intermediate transfer belt 124 serving as an endless intermediate transfer member is supported by a plurality of rollers 123 and is in contact with the photosensitive drum 112. A transfer unit 125 is arranged inside the loop of the intermediate transfer belt 124, and a transfer unit 126 and a cleaning unit 127 are arranged outside the loop of the intermediate transfer belt 124. The cleaning unit 127 is provided to be capable of being in contact with and separating from the intermediate transfer belt 124.

Image signals for respective colors are input from an image reading unit 129 to the optical writing unit 118 via an image processor (not shown). Electrostatic latent images are formed on the photosensitive drum 112 by radiating laser beams L sequentially modulated in accordance with the image signals for respective colors on the photosensitive drum 112 that is uniformly charged. The image reading unit 129 performs color separation on an image on an original set on an original tray 130 provided on an upper surface of the apparatus body 110 to read the image and convert it to electric image signals. A sheet conveying path 132 allows conveyance of a recording sheet such as paper from the right side to the left side. A pair of registration rollers 133 is arranged on the sheet conveying path 132 upstream of the intermediate transfer unit 115 and the transfer unit 126. A conveying belt 134, a fixing unit 135, and a pair of sheet discharging rollers 136 are arranged downstream of the intermediate transfer unit 115 and the transfer unit 126 along a sheet conveying direction.

The apparatus body 110 is set on a sheet feeding unit 150. A plurality of sheet feeding cassettes 151 is provided in a multistage manner inside the sheet feeding unit 150, and either one of sheet feeding rollers 152 is selectively driven so that recording sheets are fed from either one of the sheet feeding cassettes 151. The recording sheet is conveyed to the sheet conveying path 132 via an automatic sheet feeding path 137 inside the apparatus body 110. A manual feed tray 138 is provided to be openable and closable on the right side of the apparatus body 110, where a recording sheet inserted from the manual feed tray 138 is conveyed to the sheet conveying path 132 via a manual feed path 139 inside the apparatus body 110. A sheet discharge tray (not shown) is detachably mounted on the left side of the apparatus body 110, and a recording sheet discharged by the sheet discharging rollers 136 via the sheet conveying path 132 is received on the sheet discharge tray.

In the color copier of the fourth embodiment, when a color copy is made, the copying operation is performed by pressing a start button (not shown) after setting the original on the original tray 130. First, the image reading unit 129 performs color separation on an image on the original on the original tray 130 to read the image. Simultaneously, a recording sheet is selectively fed from one of the sheet feeding cassettes 151 inside the sheet feeding unit 150 by a corresponding one of the sheet feeding rollers 152, and passes through the automatic sheet feeding path 137 and the sheet conveying path 132. The recording sheet then comes into contact with the registration rollers 133 to stop.

The photosensitive drum 112 rotates in a counterclockwise direction, while the intermediate transfer belt 124 rotates in a clockwise direction according to rotation of the drive roller out of the rollers 123. The photosensitive drum 112 is uniformly charged according to rotation thereof by the charging unit 113, which is irradiated with a laser beam that is modulated by a first color image signal input to the optical writing unit 118 from the image reading unit 129 via the image processor and is emitted from the optical writing unit 118, so that an electrostatic latent image is formed on the photosensitive drum 112.

The electrostatic latent image on the photosensitive drum 112 is developed by the developing element 120A for the first color of the rotary developing unit 114 to form a first color image, and the first color image on the photosensitive drum 112 is transferred onto the intermediate transfer belt 124 by the transfer unit 125. After the first color image is transferred, the photosensitive drum 112 is cleaned by the cleaning unit 116, so that the residual toner remaining on the photosensitive drum 112 is removed therefrom. Then, the photosensitive drum 112 is neutralized by the neutralizing unit 117.

Subsequently, the photosensitive drum 112 is uniformly charged by the charging unit 113, which is irradiated with a laser beam that is modulated by a second color image signal input to the optical writing unit 118 from the image reading unit 129 via the image processor and is emitted from the optical writing unit 118, so that an electrostatic latent image is formed on the photosensitive drum 112. The electrostatic latent image on the photosensitive drum 112 is developed by the developing element 120B for the second color of the rotary developing unit 114 to form a second color image. The second color image on the photosensitive drum 112 is transferred onto the intermediate transfer belt 124 by the transfer unit 125 such that it is superimposed on the first color image. After the second color image is transferred, the photosensitive drum 112 is cleaned by the cleaning unit 116, so that the residual toner remaining on the photosensitive drum 112 is removed therefrom. Then, the photosensitive drum 112 is neutralized by the neutralizing unit 117.

Subsequently, the photosensitive drum 112 is uniformly charged by the charging unit 113, which is irradiated with a laser beam that is modulated by a third color image signal input to the optical writing unit 118 from the image reading unit 129 via the image processor and is emitted from the optical writing unit 118, so that an electrostatic latent image is formed on the photosensitive drum 112. The electrostatic latent image on the photosensitive drum 112 is developed by the developing element 120C for the third color of the rotary developing unit 114 to form a third color image. The third color image on the photosensitive drum 112 is transferred onto the intermediate transfer belt 124 by the transfer unit 125 such that it is superimposed on the first color image and the second color image. After the third color image is transferred, the photosensitive drum 112 is cleaned by the cleaning unit 116, so that the residual toner remaining on the photosensitive drum 112 is removed therefrom. Then, the photosensitive drum 112 is neutralized by the neutralizing unit 117.

Furthermore, the photosensitive drum 112 is uniformly charged by the charging unit 113, which is irradiated with a laser beam that is modulated by a fourth color image signal input to the optical writing unit 118 from the image reading unit 129 via the image processor and is emitted from the optical writing unit 118, so that an electrostatic latent image is formed on the photosensitive drum 112. The electrostatic latent image on the photosensitive drum 112 is developed by the developing element 120D for the fourth color of the rotary developing unit 114 to form a fourth color image. The fourth color image on the photosensitive drum 112 is transferred onto the intermediate transfer belt 124 by the transfer unit 125 such that it is superimposed on the first color image, the second color image, and the third color image. After the fourth color image is transferred, the photosensitive drum 112 is cleaned by the cleaning unit 116, so that the residual toner remaining on the photosensitive drum 112 is removed therefrom. Then, the photosensitive drum 112 is neutralized by the neutralizing unit 117.

Then, the registration rollers 133 are rotated at an appropriate timing to feed a recording sheet, and a full-color image on the intermediate transfer belt 124 is transferred onto the recording sheet by the transfer unit 126. The recording sheet is conveyed by the conveying belt 134 to the fixing unit 135 in which the full-color image is fixed thereon, and the recording sheet with the full-color image fixed thereto is discharged to the sheet discharge tray by the sheet discharging rollers 136. After the full-color image is transferred, the intermediate transfer belt 124 is cleaned by the cleaning unit 127, so that the residual toner is removed.

The operation for forming a four-color superimposed image is explained above. When a three-color superimposed image is formed, three different single images are sequentially formed on the photosensitive drum 112 and they are transferred onto the intermediate transfer belt 124 in a superimposing manner. Thereafter, these images are collectively transferred onto a recording sheet. Furthermore, when a two-color superimposed image is formed, two different single images are sequentially formed on the photosensitive drum 112 and they are transferred onto the intermediate transfer belt 124 in a superimposing manner. Thereafter, these images are collectively transferred onto a recording sheet. Furthermore, when a single-color image is formed, one single-color image is formed on the photosensitive drum 112 and, after being transferred onto the intermediate transfer belt 124, the image is transferred onto a recording sheet.

In the color copier as described above, rotation accuracy of the intermediate transfer belt 124 considerably influences on the quality of a final image. In the color copier of the present embodiment, the intermediate transfer belt 124 is driven by using the belt device of any of the first to third embodiments to drive the intermediate transfer belt 124 to rotate with high accuracy. Moreover, the belt device is controlled by the drive control device of any of the first to third embodiments. Furthermore, the feedback control system is configured by using one of large-diameter rollers as a drive roller out of the rollers 123 and by attaching an encoder to one of small-diameter rollers out of the rollers 123.

According to the present embodiment, the belt can be driven at a constant speed without much limitation in layout of the driven roller and the drive roller, enabling the image forming apparatus to obtain high quality images.

Figure 14:
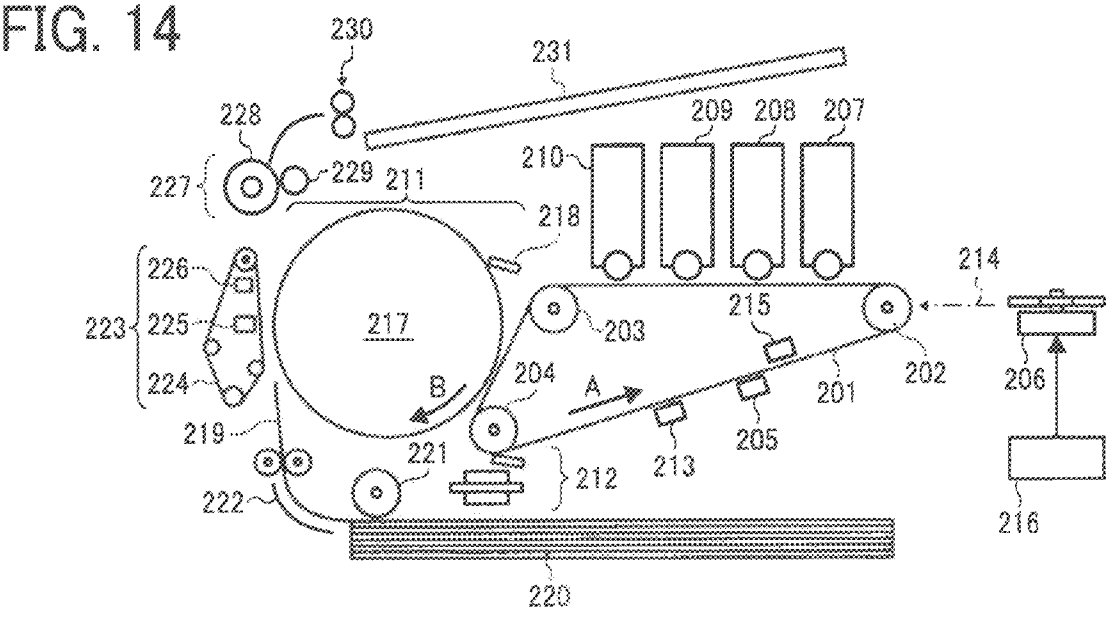
FIG. 14 is a schematic diagram of a color copier as an image forming apparatus according to a fifth embodiment of the present invention.

FIG. 14 is a schematic configuration diagram of a color copier as an image forming apparatus according to the fifth embodiment of the present invention.

A photosensitive belt 201 shown in FIG. 14 that serves as a latent image carrier is an endless photosensitive belt in which a photosensitive layer such as organic photo semiconductor (OPC) is formed in a thin film on an outer peripheral surface of a closed-loop NL belt substrate. The photosensitive belt 201 is supported by photosensitive-belt conveying rollers 202, 203, and 204 serving as supporting and rotating elements and is rotated to move in a direction indicated by an arrow A shown in FIG. 14 by a drive motor (not shown).

A charging unit 205, an exposure optical system (hereinafter, referred to as "LSU" (laser scanning unit)) 206 as an exposing unit; developing units 207, 208, 209, and 210 for respective colors of black, yellow, magenta, and cyan; an intermediate transfer unit 211; a photosensitive-belt cleaning unit 212; and a neutralizing unit 213 are arranged around the photosensitive belt 201 in this order along a rotational direction of the photosensitive belt 201 shown by the arrow A. The charging unit 205 is applied with a high voltage of about −4 kilovolts to 5 kilovolts from a power source (not shown), and charges a portion of the photosensitive belt 201 opposing the charging unit 205 to give uniform charged potential thereto.

The LSU 206 obtains exposure beams 214 by sequentially performing light intensity modulation or pulse width modulation on image signals for respective colors from a gradation converter (not shown) using a laser driving circuit (not shown) to drive a semiconductor laser (not shown) using the modulated signal, and scans the photosensitive belt 201 with the exposure beams 214, thereby sequentially forming electrostatic latent images corresponding to image signals for respective colors on the photosensitive belt 201. A seam sensor 215 detects seams on the photosensitive belt 201 formed in a loop. When the seam sensor 215 detects a seam on the photosensitive belt 201, the timing controller 216 controls beam emitting timing of the LSU 206 to avoid the seam on the photosensitive belt 201 and make electrostatic latent image forming angular displacements for respective colors become equal.

The developing units 207 to 210 contain toners corresponding to respective colors and selectively come into contact with the photosensitive belt 201 at timings according to the electrostatic latent images on the photosensitive belt 201 corresponding to image signals for respective colors to develop the electrostatic latent images on the photosensitive belt 201 using toners to form images for the respective colors, thereby forming a full-color image on which the four color images are superimposed.

The intermediate transfer unit 211 includes a drum-like intermediate transfer element (a transfer drum) 217 constituted by winding a belt-like sheet formed from electrically conductive resin or the like on a normal tube made from metal such as aluminum, and an intermediate-transfer-element cleaning unit 218 formed in a blade shape from rubber or the like. While a full-color image is being formed on the intermediate transfer element 217, the intermediate-transfer-element cleaning unit 218 is separated from the intermediate transfer element 217. The intermediate-transfer-element cleaning unit 218 is in contact with the intermediate transfer element 217 only when it cleans the intermediate transfer element 217 to remove the residual toner remaining on the intermediate transfer element 217 without transferring to a recording sheet 219 as a recording medium. The recording sheets 219 are fed one by one from a sheet feeding cassette 220 by a sheet feeding roller 221 to a sheet conveying path 222.

A transfer unit 223 transfers a full-color image on the intermediate transfer element 217 onto the recording sheet 219, and includes a transfer belt 224 obtained by forming an electrically conductive rubber or the like into a belt shape, a transfer element 225 that applies transfer bias for transferring a full-color image on the intermediate transfer element 217 onto the recording sheet 219 to the intermediate transfer element 217, and a separator 226 that applies bias to the intermediate transfer element 217 to prevent the recording sheet 219 from being electrostatically attracted to the intermediate transfer element 217 after the full-color image is transferred onto the recording sheet 219.

A fixing unit 227 includes a heat roller 228 including a heat source therein and a pressure roller 229. The recording sheet 219 onto which the full-color image is transferred passes between the heat roller 228 and the pressure roller 229, so that the recording sheet 219 is applied with heat and pressure, whereby the full-color image is fixed to the recording sheet 219.

The operation of the color copier with such configuration is explained, in which developments of electrostatic latent images are performed in the order of black, cyan, magenta, and yellow.

The photosensitive belt 201 and the intermediate transfer element 217 are driven in a direction indicated by the arrow A and an arrow B shown in FIG. 14 by the driving sources (not shown), respectively. In this state, a high voltage of about −4 kilovolts to 5 kilovolts is applied to the charging unit 205 from a power source (not shown) and a surface of the photosensitive belt 201 is uniformly charged to about −700 volts by the charging unit 205. After a predetermined time elapsed from detection of the seam on the photosensitive belt 201 made by the seam sensor 215 for avoiding the seam on the photosensitive belt 201, the photosensitive belt 201 is irradiated with an exposure beam 214 (a laser beam) corresponding to an image signal for black emitted from the LSU 206, so that charges on a portion of the photosensitive belt 201 irradiated with the exposure beam 214 are neutralized and an electrostatic latent image is formed.

The black developing unit 207 is brought into contact with the photosensitive belt 201 at a predetermined timing. Black toner in the black developing unit 207 is negatively charged in advance, and the black toner is adhered to only a portion (an electrostatic latent image portion) of the photosensitive belt 201 that is neutralized through irradiation with the exposure beam 214, that is, developing is performed according to a so-called "negative-positive process". A black toner image formed on a surface of the photosensitive belt 201 by the black developing unit 207 is transferred onto the intermediate transfer element 217. The residual toner that has not been transferred onto the intermediate transfer element 217 from the photosensitive belt 201 is removed by the photosensitive-belt cleaning unit 212, and charges on the photosensitive belt 201 are removed by the neutralizing unit 213.

Next, the surface of the photosensitive belt 201 is uniformly charged to about −700 volts by the charging unit 205.

After a predetermined time elapsed from detection of the seam on the photosensitive belt 201 made by the seam sensor 215 for avoiding the seam on the photosensitive belt 201, the photosensitive belt 201 is irradiated with the exposure beam 214 corresponding to an image signal for cyan emitted from the LSU 206, so that charges on a portion of the photosensitive belt 201 irradiated with the exposure beam 214 are neutralized and an electrostatic latent image is formed.

The cyan developing unit 208 is brought into contact with the photosensitive belt 201 at a predetermined timing. Cyan toner in the cyan developing unit 208 is negatively charged in advance, and the cyan toner is adhered to only a portion (an electrostatic latent image portion) of the photosensitive belt 201 that is neutralized through irradiation with the exposure beam 214, that is, developing is performed according to the negative-positive process. A cyan toner image formed on the surface of the photosensitive belt 201 by the cyan developing unit 208 is transferred onto the intermediate transfer element 217 in superimposition with the black toner image. The residual toner that has not been transferred onto the intermediate transfer element 217 from the photosensitive belt 201 is removed by the photosensitive-belt cleaning unit 212, and charges on the photosensitive belt 201 are removed by the neutralizing unit 213.

Next, the surface of the photosensitive belt 201 is uniformly charged to about −700 volts by the charging unit 205. After a predetermined time elapsed from detection of the seam on the photosensitive belt 201 made by the seam sensor 215 for avoiding the seam on the photosensitive belt 201, the photosensitive belt 201 is irradiated with the exposure beam 214 corresponding to an image signal for magenta emitted from the LSU 206, so that charges on a portion of the photosensitive belt 201 irradiated with the exposure beam 214 is neutralized and an electrostatic latent image is formed.

The magenta developing unit 209 is brought into contact with the photosensitive belt 201 at a predetermined timing. Magenta toner in the magenta developing unit 209 is negatively charged in advance, and the magenta toner is adhered to only a portion (an electrostatic latent image portion) of the photosensitive belt 201 that is neutralized through irradiation with the exposure beam 214, that is, developing is performed according to the negative-positive process. A magenta toner image formed on the surface of the photosensitive belt 201 by the magenta developing unit 209 is transferred onto the intermediate transfer element 217 in superimposition with the black toner image and the cyan toner image. The residual toner that has not been transferred onto the intermediate transfer element 217 from the photosensitive belt 201 is removed by the photosensitive-belt cleaning unit 212, and charges on the photosensitive belt 201 are removed by the neutralizing unit 213.

Next, the surface of the photosensitive belt 201 is uniformly charged to about −700 volts by the charging unit 205. After a predetermined time elapsed from detection of the seam on the photosensitive belt 201 made by the seam sensor 215 for avoiding the seam on the photosensitive belt 201, the photosensitive belt 201 is irradiated with the exposure beam 214 corresponding to an image signal for yellow emitted from the LSU 206, so that charges on a portion of the photosensitive belt 201 irradiated with the exposure beam 214 is neutralized and an electrostatic latent image is formed.

The yellow developing unit 210 is brought into contact with the photosensitive belt 201 at a predetermined timing. Yellow toner in the yellow developing unit 210 is negatively charged in advance, and the yellow toner is adhered to only a portion (an electrostatic latent image portion) of the photosensitive belt 201 that is neutralized through irradiation with the exposure beam 214, that is, developing is performed according to the negative-positive process. A yellow toner image formed on the surface of the photosensitive belt 201 by the yellow developing unit 210 is transferred onto the intermediate transfer element 217 in superimposition with the black toner image, the cyan toner image, and the magenta toner image, so that a full-color image is formed on the intermediate transfer element 217. The residual toner that has not been transferred onto the intermediate transfer element 217 from the photosensitive belt 201 is removed by the photosensitive-belt cleaning unit 212, and charges on the photosensitive belt 201 are removed by the neutralizing unit 213.

The transfer unit 223 that has been separated from the intermediate transfer element 217 is brought into contact with the intermediate transfer element 217 and a high voltage of about +1 kilovolt is applied from the power source (not shown) to the transfer element 225, so that the full-color image formed on the intermediate transfer element 217 is collectively transferred onto the recording sheet 219 conveyed along the sheet conveying path 222 from the sheet feeding cassette 220 by the transfer element 225.

A voltage is applied to the separator 226 from the power source such that an electrostatic force attracting the recording sheet 219 works, so that recording sheet 219 is separated from the intermediate transfer element 217. Subsequently, the recording sheet 219 is fed to the fixing unit 227, where the full-color image is fixed by utilizing a nipping force between the heat roller 228 and the pressure roller 229 and heat from the heat roller 228, and the recording sheet 219 with the full-color image fixed thereto is discharged to a sheet discharge tray 231 by a pair of sheet discharging rollers 230.

The residual toner remaining on the intermediate transfer element 217 that has not been transferred onto the recording sheet 219 is removed by the intermediate-transfer-element cleaning unit 218. The intermediate-transfer-element cleaning unit 218 is positioned at an angular displacement position where it is separated from the intermediate transfer element 217 until a full-color image is obtained. After the full-color image is transferred onto the recording sheet 219, the intermediate-transfer-element cleaning unit 218 is brought into contact with the intermediate transfer element 217 to remove the residual toner on the intermediate transfer element 217. A full-color image formed is formed on a sheet in accordance with the series of operations described above.

In such a color copier, rotational accuracy of the photosensitive belt 201 significantly influences on the quality of a final image. Therefore, it is particularly desired to drive the photosensitive belt 201 with high accuracy. In the color copier of the present embodiment, therefore, the photosensitive belt 201 is driven by using the belt device of any of the first to third embodiments, to drive the photosensitive belt 201 to rotate with high accuracy. Moreover, these rotating-member driving device and the belt device are controlled by the drive control device of any of the first to third embodiments. Furthermore, the feedback control system is configured by using one of the photosensitive-belt conveying rollers 202, 203, and 204, for example the photosensitive-belt conveying roller 202, as a drive roller, and by attaching an encoder to another one of the photosensitive-belt conveying rollers 202, 203, and 204, for example the photosensitive-belt conveying roller 203.

According to the present embodiment, the belt can be driven at a constant speed without much limitation in layout of the driven roller and the drive roller, enabling the image forming apparatus to obtain high quality images.

Figure 15:
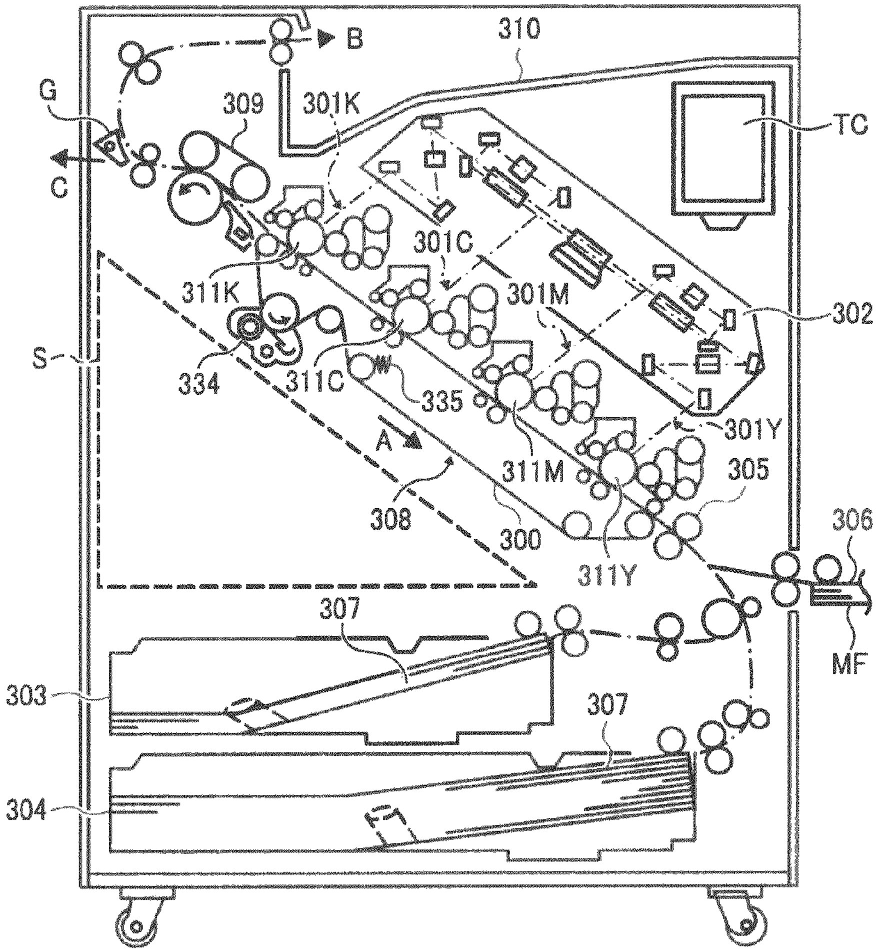
FIG. 15 is a schematic diagram of a tandem-type electrophotographic color laser printer using a direct transfer method as an image forming apparatus according to a sixth embodiment of the present invention.
Figure 16:
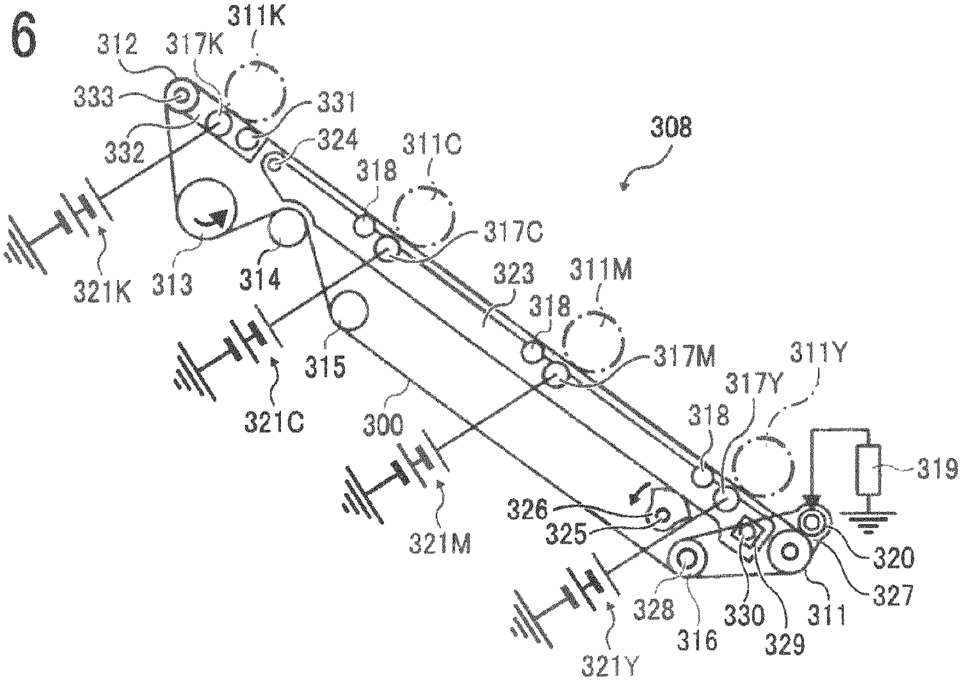
FIG. 16 is a schematic diagram of a transfer unit shown in FIG. 15.

FIG. 15 is a schematic diagram of a tandem-type electrophotographic color laser printer using a direct transfer method (hereinafter, "laser printer") that serves as an image forming apparatus according to a sixth embodiment of the present invention. FIG. 16 is a schematic diagram of a transfer unit 308 shown in FIG. 15.

In the laser printer, four toner image forming units 301Y, 301M, 301C, and 301K for forming images of respective colors of yellow (Y), magenta (M), cyan (C), and black (K) are arranged in a conveying direction of a printing sheet 306 or 307 (a direction in which a sheet conveying belt 300 is moved along an arrow A shown in FIG. 15) sequentially from an upstream side. The toner image forming units 301Y, 301M, 301C, and 301K include photosensitive drums 311Y, 311M, 311C, and 311K serving as image carries, and development units, respectively. The toner image forming units 301Y, 301M, 301C, and 301K are arranged to make rotation axes of the photosensitive drums 311Y, 311M, 311C, and 311K parallel to one another, and to have a predetermined pitch therebetween in the conveying direction of the printing sheet 306 or 307.

The laser printer also includes an optical writing unit 302, sheet feeding cassettes 303 and 304, a pair of registration rollers 305, a transfer unit 308 serving as a belt driving unit, a belt-fixing type fixing unit 309, and a sheet discharge tray 310. The transfer unit 308 includes the sheet conveying belt 300 serving as a transferring and conveying member that carries and conveys a printing sheet to pass through a transfer position of each of the toner image forming units 301Y, 301M, 301C, and 301K. Furthermore, the laser printer includes a manual feed tray MF and a toner supply container TC. In a triangular space S indicated by a two-dot chain line, a waste toner bottle, a double-sided printing and reversal printing unit, a power supply unit, and the like are provided although not shown. The optical writing unit 302 includes a light source, a polygon mirror, an f-θ lens, and a reflecting mirror. The optical writing unit 302 radiates a laser beam onto surfaces of the photosensitive drums 311Y, 311M, 311C, and 311K while scanning them based on image data.

As shown in FIG. 16, the sheet conveying belt 300 used in the transfer unit 308 is a high resistance endless single-layer belt having a volume resistivity of 109 to 1011 [Ω·cm] and is made of, for example, polyvinylidene fluoride (PVDF). The sheet conveying belt 300 is supported by supporting rollers 311, 312, 313, 314, 315, 316, and 318 to pass through the respective transfer positions at which the sheet conveying belt 300 is in contact with and opposes the photosensitive drums 311Y, 311M, 311C, and 311K. An electrostatic attraction roller 320 to which a predetermined voltage is applied from a power supply 319 is arranged outside a loop of the sheet conveying belt 300 to oppose the entrance roller (the supporting roller) 311 provided upstream in the sheet conveying direction. The printing sheet 306 or 307 passed through between the entrance roller 311 and the electrostatic attraction roller 320 is electrostatically attracted to the sheet conveying belt 300. The supporting roller 313 is a drive roller that frictionally drives the sheet conveying belt 300, and is connected to a drive source (not shown) to rotate in a direction indicated by an arrow shown in FIG. 16. Transfer-bias applying members 317Y, 317M, 317C, and 317K are provided as transfer-electric-field forming units that form a transfer electric field at each transfer position to oppose the photosensitive drums 311Y, 311M, 311C, and 311K and be in contact with a back surface of the sheet conveying belt 300. The transfer-bias applying members 317Y, 317M, 317C, and 317K are bias rollers each having a sponge or the like provided on an outer periphery thereof. Transfer bias is applied to the cores of the transfer-bias applying members 317Y, 317M, 317C, and 317K from transfer bias power supplies 321Y, 321M, 321C, and 321K, respectively. A transfer charge is applied to the sheet conveying belt 300 by an action of the transfer bias. The transfer electric field with a predetermined intensity is formed at each transfer position between the sheet conveying belt 300 and a surface of each of the photosensitive drums 311Y, 311M, 311C, and 311K.

The backup rollers (the supporting rollers) 318 are arranged to appropriately keep a contact between the printing sheet and the photosensitive drums 311Y, 311M, and 311C and to provide a best transfer nip therebetween. The transfer-bias applying members 317Y, 317M, and 317C and the backup rollers 318 in the vicinity thereof are held integrally by a swinging bracket 323 so that they can move rotationally about a rotation shaft 324. The transfer-bias applying members 317Y, 317M, and 317C and their corresponding backup rollers 318 move rotationally in a clockwise direction when a cam 326 fixed to a cam shaft 325 is rotated in a direction indicated by an arrow. The entrance roller 311 and the electrostatic attraction roller 320 are supported integrally by an entrance roller bracket 327 so that they move rotationally about a shaft 328 in the clockwise direction. A pin 330 fixedly attached to the entrance roller bracket 327 is engaged with a hole 329 formed in the swinging bracket 323, so that the entrance roller bracket 327 moves rotationally along with the rotation of the swinging bracket 323. By rotationally moving the brackets 327 and 323 in the clockwise direction, the transfer-bias applying members 317Y, 317M, and 317C and the corresponding backup rollers 318 are separated from the respective photosensitive drums 311Y, 311M, and 311C, and the entrance roller 311 and the electrostatic attraction roller 320 are moved downward. Therefore, in the case of forming only a black image, it is possible to avoid contact of the photosensitive drums 311Y, 311M, and 311C with the sheet conveying belt 300.

The transfer-bias applying member 317K and the backup roller 318 in the vicinity thereof are integrally supported by an exit bracket 332 so that they can move rotationally about a shaft 333 coaxial with the exit roller 312. When the transfer unit 308 is attached to or detached from an apparatus body, the exit bracket 332 is rotated clockwise by operating a handle (not shown) to separate the transfer-bias application member 317K and the backup roller 318 from the photosensitive drum 311K for forming a black image. A cleaning unit 334 that includes a brush roller and a cleaning blade is arranged to be in contact with an outer peripheral surface of the sheet conveying belt 300 that is supported by the drive roller 313. The cleaning unit 334 removes foreign matters such as toners adhering to the sheet conveying belt 300. The supporting roller 314 is provided downstream of the drive roller 313 in a moving direction of the sheet conveying belt 300 so that the supporting roller 314 presses the outer peripheral surface of the sheet conveying belt 300. By providing the supporting roller 314 in such a manner, a winding angle at which the sheet conveying belt 300 is supported by the drive roller 313 is secured. The tension roller (the supporting roller) 315 that applies a tension to the sheet conveying belt 300 by a pressing member (a spring) 335 is provided within a loop of the sheet conveying belt 300 downstream of the supporting roller 314.

A dashed line shown in FIG. 15 indicates a conveying path for conveying the printing sheets 306 and 307. The printing sheet 306 or 307 fed from the sheet feeding cassette 303 or 304 or the manual feed tray MF is conveyed by conveying rollers while being guided by a conveying guide (not shown) to a temporary stop position at which the registration rollers 305 are provided. The printing sheet 306 or 307, which is fed to the temporary stop position, is fed forward by the registration rollers 305 at a predetermined timing to be conveyed toward the respective toner image forming units 301Y, 301M, 301C, and 301K while being carried on the sheet conveying belt 300. Upon the printing sheet 306 or 307 passing through the respective transfer nips formed by the photosensitive drums 311Y, 311M, 311C, and 311K, toner images developed on the photosensitive drums 311Y, 311M, 311C, and 311K are transferred onto the printing sheet 306 or 307 in a superimposing manner by actions of the transfer electric field and a nip pressure. With the above operations, a full-color toner image is formed on the printing sheet 306 or 307. Surfaces of the photosensitive drums 311Y, 311M, 311C, and 311K after transfer of the toner images are cleaned by the cleaning unit 334 and neutralized for preparation of formation of next electrostatic latent images.

The printing sheet 306 or 307 onto which the full-color toner image is transferred is conveyed to the fixing unit 109, in which the full-color toner image is fixed to the printing sheet 306 or 307. The printing sheet 306 or 307 with the full-color toner image fixed thereto is conveyed in a first sheet-discharging direction B or a second sheet-discharging direction C depending upon a switching position by a switching guide G. When the printing sheet 306 or 307 is conveyed in the first sheet-discharging direction B to be discharged onto the sheet discharge tray 310, the printing sheet 306 or 307 is stacked on the sheet discharge tray 310 with its image printed side downward, i.e., in a so-called facedown state. When the printing sheet 306 or 307 is conveyed in the second sheet-discharging direction C, the printing sheet 306 or 307 is conveyed toward another post-processing unit (e.g., a sorter or a binder) (not shown) or toward the registration rollers 305 again for double-sided printing through a switch back unit. In such image forming apparatus, an encoder is attached to the drive roller 313 for moving the sheet conveying belt 300 or a driven roller in the transfer unit 308, thereby controlling the driving of the sheet conveying belt 300.

In the present embodiment, the sheet conveying belt 300 is driven by using the belt device of any of the first to third embodiments to drive the sheet conveying belt 300 to rotate with high accuracy. Moreover, these belt driving control devices are controlled by the drive control device of any of the first to third embodiments. Furthermore, the feedback control system is configured by using the supporting roller 313 as a drive roller and by attaching an encoder to one of the supporting rollers 311, 312, 314, 315, and 316.

According to the present embodiment, the belt can be driven at a constant speed without much limitation in layout of the driven roller and the drive roller, enabling the image forming apparatus to obtain high quality images.

In the present embodiment, the present invention is applied as the transfer unit 308 in the tandem-type color laser printer in which the photosensitive drums 311Y, 311M, 311C, and 311K are arranged in series; however, the present invention can be employed to other printers and belt driving devices. For example, the present invention can be employed to any type of printers including a belt driving device that drives an endless belt supported by a plurality of supporting rollers to rotate by at least one of the supporting rollers.

Figure 17:
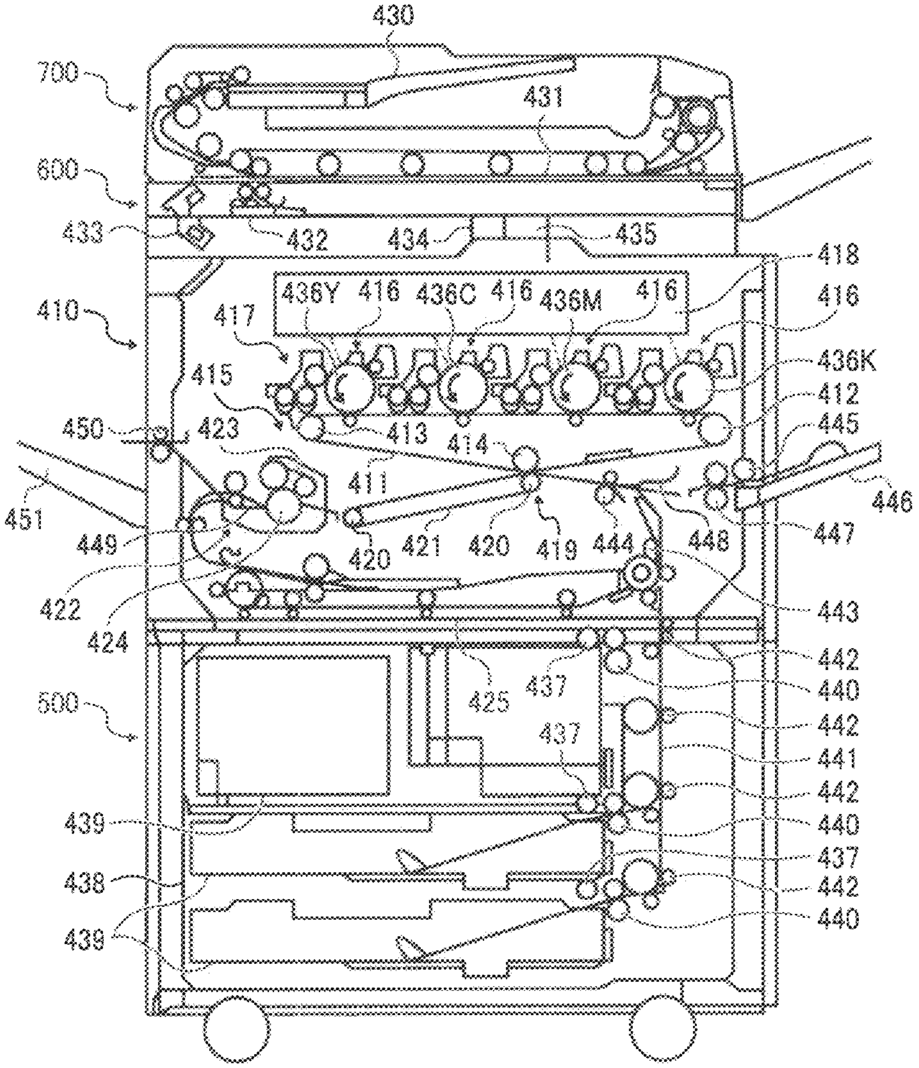
FIG. 17 is a schematic diagram of a tandem-type electrophotographic color copier using an indirect transfer method as an image forming apparatus according to a seventh embodiment.

FIG. 17 is a schematic diagram of a tandem-type electrophotographic color copier using an indirect transfer method as an image forming apparatus according to a seventh embodiment. The color copier is largely divided into an apparatus body 410, a sheet feeding table 500 on which the apparatus body 410 is mounted, a scanner 600 mounted on the apparatus body 410, and an automatic document feeder (ADF) 700 mounted on the scanner 600.

The apparatus body 410 includes an endless belt-like intermediate transfer element 411 provided at the central part thereof. The intermediate transfer element 411 has a base layer formed with, for example, fluororesin having low distensibility or a material obtained by combining a material such as canvas having low distensibility with a rubber material having high distensibility, and an elastic layer provided on the base layer. The elastic layer is formed with fluororubber or acrylonitrile-butadiene copolymer rubber, or the like. The surface of the elastic layer is coated with, for example, fluororesin as a coat layer with high smoothness.

As shown in FIG. 17, the intermediate transfer element 411 is supported by three supporting rollers 412, 413, and 414 to allow the intermediate transfer element 411 to rotate clockwise. The supporting roller 413 is a drive roller, and an encoder is attached to the supporting roller 412 as a driven roller. The drive control system of these components is the same as that of the first and second embodiments, and hence overlapping explanation is omitted.

As shown in FIG. 17, an intermediate-transfer-element cleaning unit 415 for removing residual toner remaining on the intermediate transfer element 411 after image transfer is provided on the left side of the supporting roller 413. Above the intermediate transfer element 411 that is supported by the supporting rollers 412 and 413, four image forming units 416 including photosensitive elements 436Y, 436C, 436M, and 436K for yellow, cyan, magenta, and black are arranged in series along a direction in which the intermediate transfer element 411 moves to form a tandem-type image forming apparatus 417.

Furthermore, an exposing unit 418 is provided above the image forming apparatus 417. A secondary transfer unit 419 is provided opposite to the image forming apparatus 417 with the intermediate transfer element 411 therebetween. In the example of FIG. 17, the secondary transfer unit 419 is configured such that a secondary endless transfer belt 421 is supported by two supporting rollers 420 and the secondary endless transfer belt 421 is pressed against the supporting roller 414 via the intermediate transfer element 411 so that an image on the intermediate transfer element 411 is transferred onto a sheet. A fixing unit 422 that fixes the transferred image to the sheet is provided next to the secondary transfer unit 419. The fixing unit 422 is configured such that a pressure roller 424 is pressed against a fixing belt 423 as an endless belt.

The secondary transfer unit 419 also includes a sheet conveying function for conveying the sheet with the transferred image thereon to the fixing unit 422. The secondary transfer unit 419 can include a transfer roller and a non-contact charging unit; however, in this case, it becomes difficult for the unit to have the sheet conveying function.

In the example of FIG. 17, a sheet reversing unit 425 is provided under the secondary transfer unit 419 and the fixing unit 422 in parallel with the image forming apparatus 417. The sheet reversing unit 425 reverses a sheet to record images on both surfaces of the sheet.

When copying is performed using the color copier, an original is placed on an original tray 430 of the ADF 700. Alternatively, the ADF 700 is opened to place an original on an exposure glass 431 of the scanner 600 and is then closed to press the original.

Upon pressing of a start button (not shown), the original placed on the original tray 430 is conveyed to be placed on the exposure glass 431 and is scanned by the scanner 600. On the other hand, when the original is placed on the exposure glass 431, the scanner 600 is immediately driven to run a first movable element 432 and a second movable element 433. Light is radiated to the original from a light source by the first movable element 432, and the light reflected from the surface of the original is further reflected to be directed toward the second movable element 433. The light reflected by a mirror of the second movable element 433 passes through an imaging lens 434 to form an image on a reading sensor 435. In this manner, a content of the original is read.

Furthermore, upon pressing of the start button, the drive motor and the drive roller 413 are driven to rotate to allow the supporting rollers 412 and 414 to rotate, and the intermediate transfer element 411 is rotated. At the same time, the photosensitive elements 436Y, 436C, 436M, and 436K of the respective image forming units 416 are rotated to form black, yellow, magenta, and cyan single-color images on the photosensitive elements 436Y, 436C, 436M, and 436K, respectively. With the movement of the intermediate transfer element 411, the single-color images are sequentially transferred onto the intermediate transfer element 411 to form a composite color image thereon.

Furthermore, upon pressing of the start button, one of sheet feeding rollers 437 of the sheet feeding table 500 is selectively rotated to send out sheets from a corresponding one of sheet feeding cassettes 439 provided in a multistage manner in a paper bank 438. The sheets are led into a sheet conveying path 441 one by one by separation rollers 440 to be conveyed by conveying rollers 442 to a sheet conveying path 443 in the apparatus body 410. The sheet stops when it comes into contact with a pair of registration rollers 444.

When sheets are fed from a manual feed tray 446, a sheet feeding roller 445 is rotated to lead the sheets into a manual feed path 448 one by one by separation rollers 447. The sheet stops when it comes into contact with the registration rollers 444.

The registration rollers 444 are rotated in synchronization with the timing of the composite color image on the intermediate transfer element 411. The sheet is fed into a nip between the intermediate transfer element 411 and the secondary transfer unit 419, so that the color image is transferred onto the sheet by the secondary transfer unit 419.

The sheet after the image is transferred thereto is conveyed by the secondary transfer unit 419 to the fixing unit 422. The image on the sheet is fixed thereto in the fixing unit 422 by heat and pressure, and then the sheet is discharged by discharging rollers 450 by switching a switching claw 449. The discharged sheet is stacked on a sheet discharge tray 451. Alternatively, the sheet is conveyed to the sheet reversing unit 425 by switching the switching claw 449. The sheet conveyed to the sheet reversing unit 425 is reversed to be conveyed again to a transfer position. Then, an image is recorded on the back surface of the sheet, and the sheet with the images recorded on both sides is discharged onto the sheet discharge tray 451 by the discharging rollers 450.

The residual toner remaining on the intermediate transfer element 411 after the image is transferred is cleaned by the intermediate-transfer-element cleaning unit 415, so that the intermediate transfer element 411 is in standby state for the next image formation by the image forming apparatus 417. The registration rollers 444 are generally grounded; however, it is also possible to apply a bias thereto to remove paper dust of the sheet.

In such a color copier, driving accuracy of the intermediate transfer element 411 significantly influences on the quality of a final image. Therefore, it is desired to control driving of the intermediate transfer element 411 with higher accuracy. In the present embodiment, therefore, the belt-conveyance control device of any of the first to third embodiments is used as the drive system of the intermediate transfer element 411 in such copier. Furthermore, the feedback control system is configured by using the supporting roller 413 as a drive roller and by attaching an encoder to the supporting roller 412.

According to the present embodiment, the belt can be driven at a constant speed without much limitation in layout of the driven roller and the drive roller, enabling the image forming apparatus to obtain high quality images.

For correcting driving of the drive roller, the home position in one rotation is used as a reference. However, the correction target is a geometric drive error, so that it is considered that this correction and the positions of pulses do not change in every rotation. Therefore, driving of the drive roller can be corrected by always monitoring the rotational position of the drive roller without using the physical home position as a reference.

Figure 18:
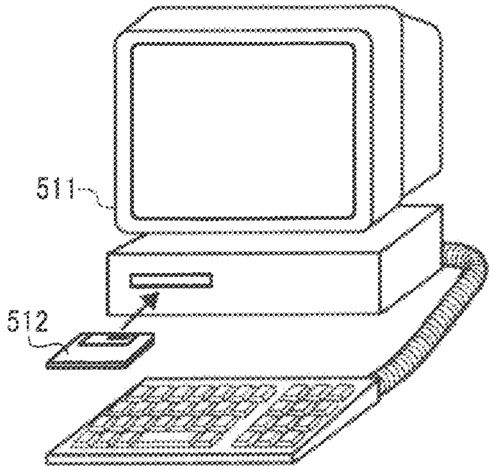
FIG. 18 is a perspective view of a personal computer that can be used to execute drive control in each of the embodiments.

The drive control in the embodiments can be executed using a computer. FIG. 18 is a perspective view of a personal computer (PC) 511 as one example that can be used to execute drive control in each of the embodiments. A recording medium 512 detachably attached to the PC 511 stores therein computer programs to allow the PC 511 to perform calculations for control and data input/output. The PC 511 executes the computer programs stored in the recording medium 512 to execute drive control in the embodiments. The recording medium 512 includes an optical disk such as a compact disk read only memory (CD-ROM) and a magnetic disk such as a flexible disk. The computer programs can be downloaded into the PC 511 through a communication network without using the recording medium.

In the present embodiment, it is desired that the ratio between a perimeter of each of the drive roller 413 and the driven roller 412 and the interval between the photosensitive elements 436Y, 436M, 436C, and 436K is approximately an integral ratio.

As the computer used to execute the drive control according to the first to seventh embodiments, a microcomputer can be used. The microcomputer is used by being incorporated in the image forming apparatuses of FIGS. 13 to 17. In this case, as the recording medium storing the control program, a ROM in the microcomputer can be used.

Specifically, the program includes the followings. For example, the first to third embodiments employ a control program that allows the computer to rotate the belt 30. The fourth embodiment employs a control program that allows the computer to control the belt unit that drives the intermediate transfer belt 124 of the image forming apparatus. The fifth embodiment employs a control program that allows the computer to control the belt unit that drives the photosensitive belt 201 of the image forming apparatus. The sixth embodiment employs a control program that allows the computer to control the belt unit that drives the sheet conveying belt 300 of the image forming apparatus. The seventh embodiment employs a control program that allows the computer to control the belt unit that drives the intermediate transfer element 411 of the image reading apparatus.

According to each of the embodiments, the belt as a moving element can be controlled to be driven at a constant speed with high accuracy even if the belt is deflected, so that high quality images can be obtained by an image forming apparatus.

The drive control apparatus of the present invention can be used without any limitation to the driving of the belt at a constant speed in the image forming apparatus and the image reading apparatus. For example, the drive control device of the present invention is applicable to drive control of the movable element in an optical disk drive (ODD), a hard disk drive (HDD), a robot, or the like.

As described above, according to an aspect of the present invention, the belt can be driven at a constant speed without much limitation in layout of the driven roller and the drive roller, enabling the image forming apparatus to obtain high quality images.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A belt-conveyance control device that includes a belt that is supported by a drive roller and a driven roller, a pulse motor that drives the drive roller, and a first encoder that is attached to the driven roller to detect an angular displacement of the driven roller, the belt-conveyance control device controlling a conveying speed of the belt, the belt-conveyance control device comprising:

a control unit that calculates a difference between the angular displacement detected by the first encoder and a predetermined reference displacement value of the driven roller, calculates a pulse frequency of a driving pulse signal for driving the pulse motor based on a feedback control based on the calculated difference and a feed-forward control based on a reference driving pulse frequency, sets a control range of the feedback control to be smaller than a frequency of one rotation of the driven roller, and controls driving of the pulse motor such that the belt moves at a constant speed.

2. The belt-conveyance control device according to claim 1, wherein a transmission system from the pulse motor to the drive roller is a transmission system in which the angular displacement of the driven roller is lower than one rotation of the driven roller.

3. The belt-conveyance control device according to claim 1, wherein a diameter of the drive roller is larger than that of the driven roller.

4. The belt-conveyance control device according to claim 1, wherein the control unit adds a target pulse frequency for cancelling a fluctuation component associated with the drive roller in a transmission system from the pulse motor to the drive roller.

5. The belt-conveyance control device according to claim 1, further comprising:

a second encoder that is attached to the drive roller to detect a fluctuation component in the transmission system, wherein the control unit generates the reference driving pulse frequency based on the fluctuation component in the transmission system measured by the second encoder.

6. The belt-conveyance control device according to claim 1, wherein the control unit causes at least one of a rotation frequency of a transmission system from the pulse motor to the drive roller and a rotation frequency of the drive roller to be different from a rotation frequency of the driven roller by one rotation, and adds to the reference driving pulse frequency a target pulse frequency that is generated based on a result of measurement by the first encoder with respect to a fluctuation component of at least one of the transmission system and the drive roller whose rotation frequency is made different from that of the driven roller by one rotation.

7. The belt-conveyance control device according to claim 6, wherein the control unit sets at least one of the rotation frequency of the transmission system and the rotation frequency of the drive roller in one rotation to be lower than the rotation frequency of the driven roller in one rotation.

8. An image forming apparatus comprising the belt-conveyance control device according to claim 1.

9. The image forming apparatus according to claim 8, wherein the belt is a photosensitive belt.

10. The image forming apparatus according to claim 8, wherein the belt is an intermediate transfer belt.

11. The image forming apparatus according to claim 10, further comprising:

a plurality of photosensitive elements that transfers images with different colors onto the intermediate transfer belt, wherein a perimeter of each of the drive roller and the driven roller is approximately equal to an interval between the photosensitive elements.

12. The image forming apparatus according to claim 8, wherein the belt is a sheet conveying belt.

13. A method of controlling a conveying speed of a belt in a belt-conveyance control device that includes the belt that is supported by a drive roller and a driven roller, a pulse motor that drives the drive roller, and an encoder that is attached to the driven roller to detect an angular displacement of the driven roller, the method comprising:

calculating a difference between the angular displacement detected by the encoder and a predetermined displacement reference value of the driven roller;

calculating a pulse frequency of a driving pulse signal for driving the pulse motor based on a feedback control based on the difference and a feed-forward control based on a reference driving pulse frequency;

setting a control range of the feedback control to be smaller than a frequency of one rotation of the driven roller; and controlling driving of the pulse motor such that the belt moves at a constant speed.

14. The method according to claim 13, wherein the controlling includes adding a target pulse frequency for cancelling a fluctuation component associated with the drive roller in a transmission system from the pulse motor to the drive roller.

15. The method according to claim 13, wherein the controlling includes causing at least one of a rotation frequency of a transmission system from the pulse motor to the drive roller and a rotation frequency of the drive roller to be different from a rotation frequency of the driven roller by one rotation, and adding to the reference driving pulse frequency a target pulse frequency that is generated based on a result of measurement by the encoder with respect to a fluctuation component of at least one of the transmission system and the drive roller whose rotation frequency is made different from that of the driven roller by one rotation.

16. The method according to claim 13, wherein the belt is a photosensitive belt.

17. The method according to claim 13, wherein the belt is an intermediate transfer belt.

18. The method according to claim 13, wherein the belt is a sheet conveying belt.

19. A computer program product comprising a non-transitory computer-usable medium having computer-readable program codes embodied in the medium for controlling a conveying speed of a belt in a belt-conveyance control device that includes the belt that is supported by a drive roller and a driven roller, a pulse motor that drives the drive roller, and an encoder that is attached to the driven roller to detect an angular displacement of the driven roller, the program codes when executed causing a computer to execute:

calculating a difference between the angular displacement detected by the encoder and a predetermined displacement reference value of the driven roller;

calculating a pulse frequency of a driving pulse signal for driving the pulse motor based on a feedback control based on the calculated difference and a feed-forward control based on a reference driving pulse frequency;

setting a control range of the feedback control to be smaller than a frequency of one rotation of the driven roller; and controlling driving of the pulse motor such that the belt moves at a constant speed.

20. The computer program product according to claim 19, wherein the controlling includes adding a target pulse frequency for cancelling a fluctuation component associated with the drive roller in a transmission system from the pulse motor to the drive roller.

* * * * *